United States Patent
Tanaka et al.

(10) Patent No.: US 9,285,565 B2
(45) Date of Patent: Mar. 15, 2016

(54) IMAGING LENS AND IMAGING APPARATUS EQUIPPED WITH THE IMAGING LENS

(71) Applicant: FUJIFILM CORPORATION, Tokyo (JP)

(72) Inventors: Takuya Tanaka, Saitama (JP); Michio Cho, Saitama (JP); Takayuki Noda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/595,237

(22) Filed: Jan. 13, 2015

(65) Prior Publication Data

US 2015/0198790 A1    Jul. 16, 2015

(30) Foreign Application Priority Data

Jan. 16, 2014    (JP) .................................. 2014-005649

(51) Int. Cl.

| | |
|---|---|
| *G02B 3/02* | (2006.01) |
| *G02B 13/18* | (2006.01) |
| *G02B 9/60* | (2006.01) |
| *G02B 13/00* | (2006.01) |
| *G03B 13/32* | (2006.01) |

(52) U.S. Cl.
CPC ............ *G02B 13/0045* (2013.01); *G03B 13/32* (2013.01); *G02B 9/60* (2013.01)

(58) Field of Classification Search
CPC .............................. G02B 9/60; G02B 13/0045
USPC .................................................... 359/714, 764
See application file for complete search history.

(56) References Cited

U.S. PATENT DOCUMENTS

| | | | |
|---|---|---|---|
| 8,179,614 B1 * | 5/2012 | Tsai ................... | G02B 13/0045 359/714 |
| 2013/0050847 A1 | 2/2013 | Hsu et al. | |
| 2013/0077181 A1 | 3/2013 | Chen et al. | |
| 2013/0093942 A1 | 4/2013 | Okano | |

FOREIGN PATENT DOCUMENTS

CN    103018887    4/2013

* cited by examiner

*Primary Examiner* — William Choi
(74) *Attorney, Agent, or Firm* — Young & Thompson

(57) ABSTRACT

An imaging lens, substantially consisting of five lenses, composed of a positive first lens with a convex surface on the object side, a negative second lens with a concave surface on the object side, a third lens having a negative meniscus shape with a convex surface on the object side, a fourth lens having a positive meniscus shape with a concave surface on the object side, and a negative fifth lens with a concave surface on the image side, the image side surface having an aspherical shape with at least one inflection point located inward in a radial direction from the intersection between the image side surface and a principal ray of the maximum angle of view toward the optical axis, disposed in order from the object side, and satisfies given conditional expressions.

18 Claims, 24 Drawing Sheets

EXAMPLE 4

EXAMPLE 1

EXAMPLE 4

EXAMPLE 5

EXAMPLE 9

EXAMPLE 11

IMAGING LENS AND IMAGING APPARATUS EQUIPPED WITH THE IMAGING LENS

CROSS-REFERENCE TO RELATED APPLICATIONS

The present application claims priority under 35 U.S.C. §119 to Japanese Patent Application No. 2014-005649 filed on Jan. 16, 2014. The above application is hereby expressly incorporated by reference, in its entirety, into the present application.

BACKGROUND OF THE INVENTION

1. Field of the Invention

The present invention relates to a fixed-focus imaging lens that forms an optical image of a subject on an image sensor, such as, for example, a CCD (Charge Coupled Device) or a CMOS (Complementary Metal Oxide Semiconductor), and an imaging device equipped with the imaging lens and performs imaging, such as a digital still camera, a camera equipped portable phone, a personal digital assistance (PDA), a smartphone, a tablet terminal, a portable game machine, or the like.

2. Description of the Related Art

Along with a widespread use of personal computers in homes, digital still cameras that can input image information, such as imaged landscapes and portraits, in personal computers are spreading rapidly. In addition, more and more portable phones, smartphones, and tablet terminals are equipped with camera modules for image input. Such devices having imaging capabilities use image sensors, such as CCDs, CMOSs, and the like. Recently, as downsizing of these image sensors have advanced, imaging devices as a whole and imaging lenses equipped therein are also demanded to be downsized. At the same time, higher pixel counts of image sensors are also in progress, and high resolution and high performance are demanded for imaging lenses. For example, performance that meets the requirement of higher pixel counts of 5 mega pixels or greater, more preferably, 8 mega pixels or greater are demanded.

In order to meet such demands, an imaging lens composed of a relatively large number of lenses, i.e., five lenses, is proposed. For example, U.S. Patent Application Publication No. 20130093942, U.S. Pat. No. 8,179,614, U.S. Patent Application Publication No. 20130050847, U.S. Patent Application Publication No. 20130077181 and Chinese Patent Publication No. 103018887, each proposes a five element imaging lens, composed of a first lens having a positive refractive power, a second lens having a negative refractive power, a third lens having a negative refractive power, a fourth lens having a positive refractive power, and a fifth lens having a negative refractive power, disposed in order from the object side.

SUMMARY OF THE INVENTION

In the meantime, for imaging lenses used, in particular, for the devices which tend to thinning, such as smartphones and tablet terminals, the size increase of image sensors is underway along with the demand for higher pixel counts. In order to be applied to an image sensor having a large image size for satisfying the demand for higher pixel counts, there is an ever growing demand for an imaging lens to have a reduced overall size with respect the image size. Further, along with the demand for higher resolution, the pixel size is reduced with increase in the image size, the sensitivity of image sensors tends to be relatively reduced and there is a demand for realizing an imaging lens having a smaller F-number. But the imaging lenses described in U.S. Patent Application Publication No. 20130093942, U.S. Pat. No. 8,179,614, U.S. Patent Application Publication No. 20130050847 and U.S. Patent Application Publication No. 20130077181 are undesirable for use with image sensors having sizes that satisfy the demand for higher pixel counts, because the overall length is too long. The imaging lens described in Chinese Patent Publication No. 103018887 is undesirable because the ratio of the overall lens length to the focal length of the entire system is not sufficiently small.

The present invention has been developed in view of the aforementioned points, and it is an object of the present invention to provide an imaging lens having a small F-number and high imaging performance from the central to peripheral angles of view, while reducing the overall lens length with respect to image size and the focal length. It is a further object of the present invention to provide an imaging apparatus equipped with the imaging lens and capable of capturing high resolution images.

An imaging lens of the present invention substantially consists of five lenses, composed of a first lens having a positive refractive power and a convex surface on the object side, a second lens having a negative refractive power and a concave surface on the object side, a third lens having a negative refractive power and a meniscus shape with a convex surface on the object side, a fourth lens having a positive refractive power and a meniscus shape with a concave surface on the object side, and a fifth lens having a negative refractive power and a concave surface on the image side, the image side surface having an aspherical shape with at least one inflection point located inward in a radial direction from the intersection between the image side surface and a principal ray of the maximum angle of view toward the optical axis, disposed in order from the object side, and satisfies conditional expressions given below:

$$0.91 < f/f1 < 2.47 \quad (1)$$

$$-2.13 < f/f5 < -1.03 \quad (2)$$

$$1.2 < TTL/(f \cdot \tan \omega) < 1.57 \quad (3)$$

where
f: focal length of the entire system,
f1: focal length of the first lens,
f5: focal length of the fifth lens,
TTL: distance on the optical axis from the object side surface of the first lens to the image plane when the back focus is expressed in air equivalent distance, and
ω: maximum half angle of view when an object at infinity is in focus.

In the imaging lens of the present invention, employment of preferable configurations described below may further improve the optical performance.

In the imaging lens of the present invention, the object side surface of the second lens preferably has an aspherical shape having at least one inflection point located inward in a radial direction from the intersection between the object side surface and an axial marginal ray toward the optical axis.

In the imaging lens of the present invention, the object side surface of the third lens preferably has an aspherical shape having at least one inflection point located inward in a radial direction from the intersection between the object side surface and an axial marginal ray toward the optical axis.

Preferably, the imaging lens of the present invention further includes an aperture stop disposed on the object side of the object side surface of the first lens.

Preferably, the imaging lens of the present invention satisfies any one or any combination of conditional expressions (4), (5), (1-1) to (4-1), (1-2) to (4-2) and (1-3) to (3-3) given below:

$$0.5 < L1f/\phi < 0.97 \quad (4)$$

$$1 \leq f \cdot \tan \omega / L5r < 3 \quad (5)$$

$$1.1 < f/f1 < 2.05 \quad (1\text{-}1)$$

$$-1.9 < f/f5 < -1.13 \quad (2\text{-}1)$$

$$1.3 < TTL/(f \cdot \tan \omega) < 1.51 \quad (3\text{-}1)$$

$$0.65 < L1f/\phi < 0.91 \quad (4\text{-}1)$$

$$1.22 < f/f1 < 2.05 \quad (1\text{-}2)$$

$$-1.9 < f/f5 < -1.2 \quad (2\text{-}2)$$

$$1.34 < TTL/(f \cdot \tan \omega) < 1.51 \quad (3\text{-}2)$$

$$0.75 < L1f/\phi < 0.87 \quad (4\text{-}2)$$

$$1.22 < f/f1 < 1.86 \quad (1\text{-}3)$$

$$-1.81 < f/f5 < -1.2 \quad (2\text{-}3)$$

$$1.34 < TTL/(f \cdot \tan \omega) < 1.49 \quad (3\text{-}3)$$

where f: focal length of the entire system,
f1: focal length of the first lens,
f5: focal length of the fifth lens,
L1f: paraxial radius of curvature of the object side surface of the first lens,
L5r: paraxial radius of curvature of the image side surface of the fifth lens,
TTL: distance on the optical axis from the object side surface of the first lens to the image plane when the back focus is expressed in air equivalent distance,
φ: entrance pupil diameter, and
ω: maximum half angle of view when an object at infinity is in focus.

In the imaging lens of the present invention, the term "substantially consists of five lenses" refers to include the case in which that the imaging lens of the present invention includes a lens having substantially no refractive power, an optical element other than a lens, such as a stop, a cover glass, and the like, a lens flange, a lens barrel, and a mechanical component, for example, a camera shake correction mechanism, in addition to the five lenses.

The surface shapes and the signs of refractive powers of the aforementioned lenses are considered in the paraxial region if they include aspherical surfaces. The sign of a radius of curvature is positive for a surface shape with a convex surface on the object side and negative for a surface shape with a convex surface on the image side.

The term "inflection point" as used herein refers to a point where the surface shape is changed from a convex shape to a concave shape (or from a concave shape to a convex shape) with respect to the image side.

An imaging apparatus of the present invention is equipped with the imaging lens of the present invention.

According to the imaging lens of the present invention, each lens element is optimally formed in a five-element configuration as a whole to satisfy given conditional expressions. This allows a lens system having a small F-number and high imaging performance from the central to peripheral angles of view, while reducing the overall lens length with respect to image size and the focal length to be realized.

According to the imaging apparatus of the present invention, the size of the apparatus in an optical axis direction of the imaging lens may be reduced, and a high resolution image may be obtained, as the apparatus is equipped with the imaging lens of the present invention.

DESCRIPTION OF THE PREFERRED EMBODIMENTS

Hereinafter, embodiments of the present invention will be described in detail with reference to the accompanying drawings.

Figure 1:
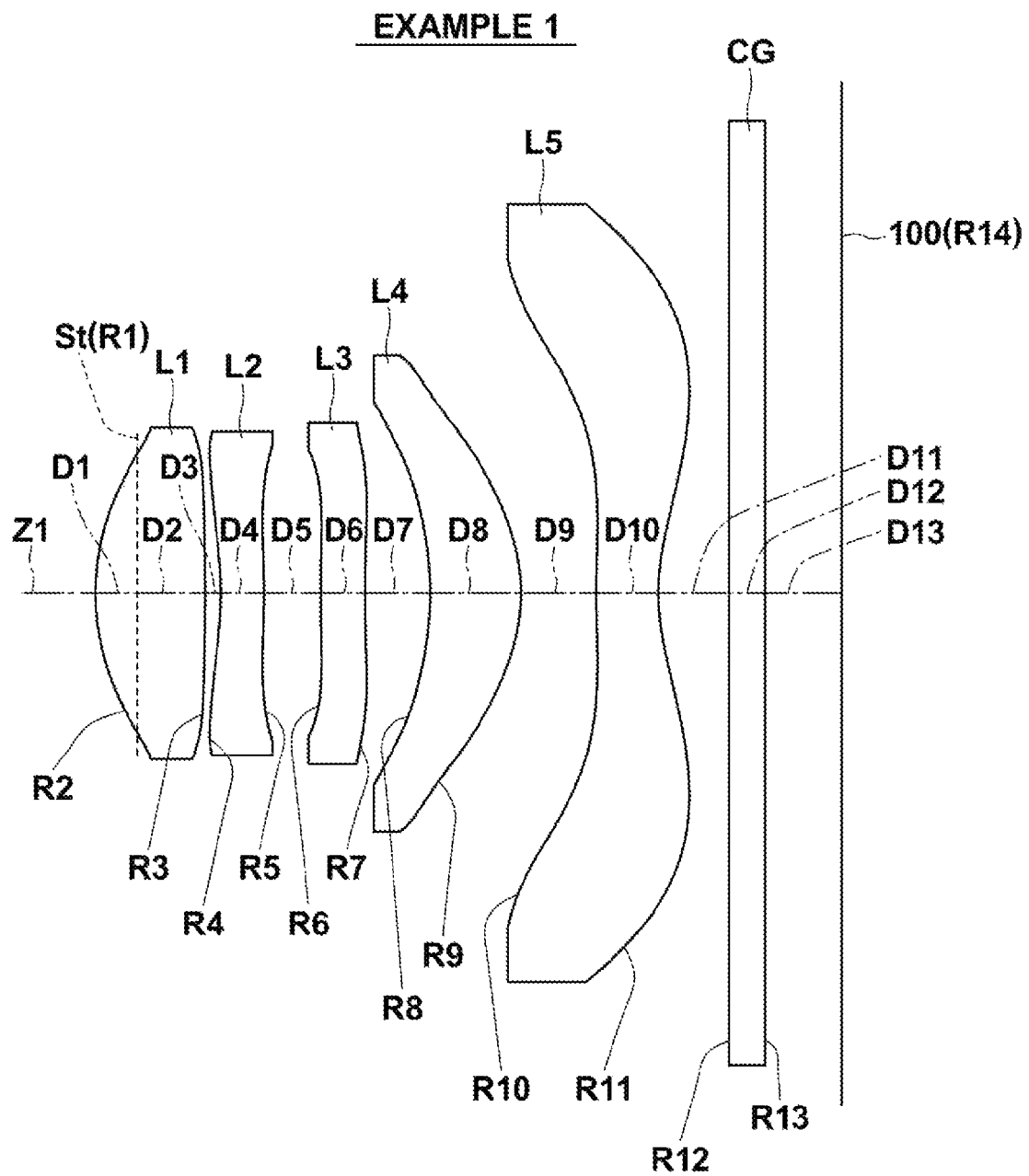
FIG. 1 is a cross-sectional view of an imaging lens according to one embodiment of the present invention, illustrating a first configuration example which corresponds to Example 1.
Figure 2:
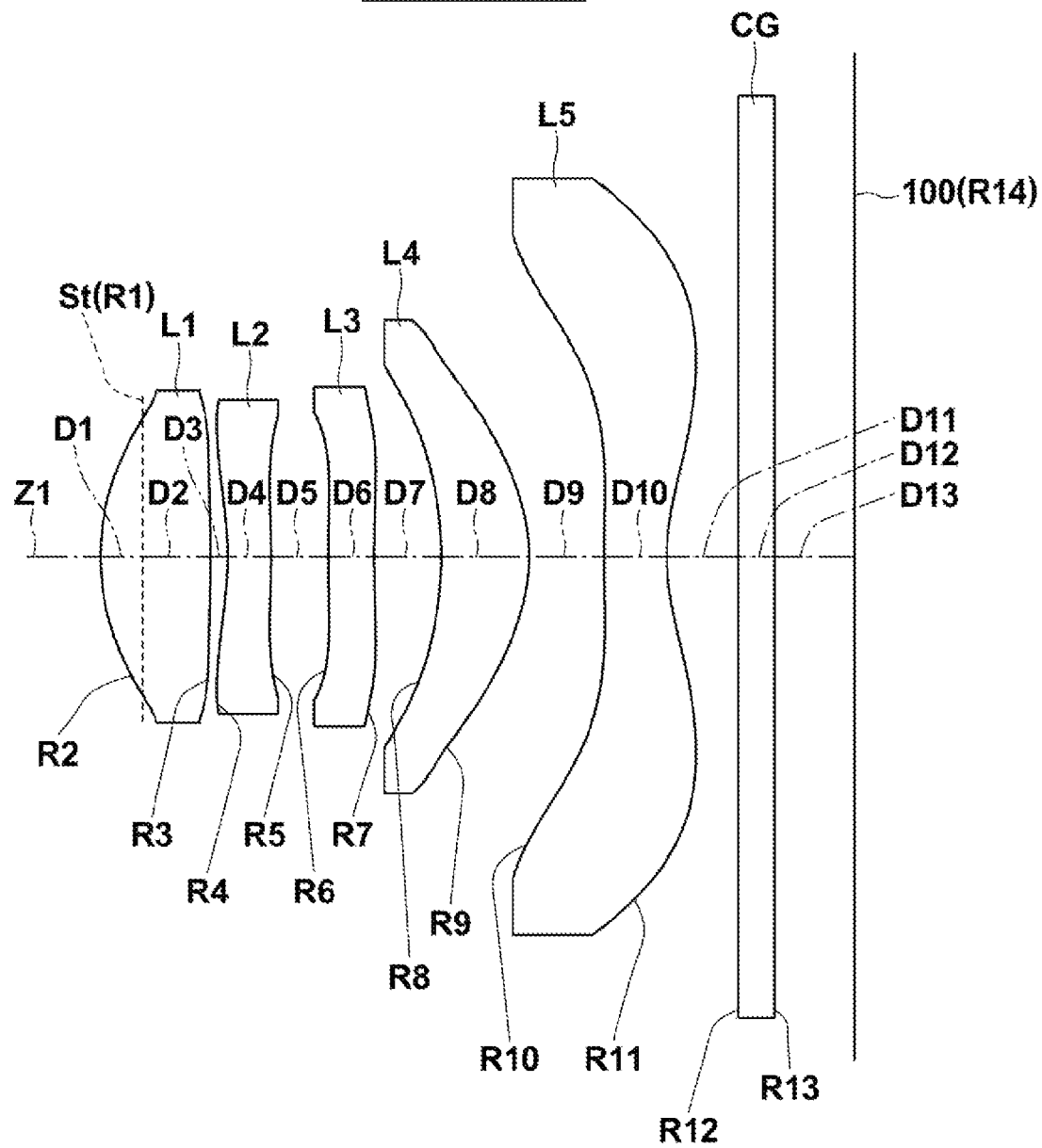
FIG. 2 is a cross-sectional view of an imaging lens according to one embodiment of the present invention, illustrating a second configuration example which corresponds to Example 2.
Figure 3:
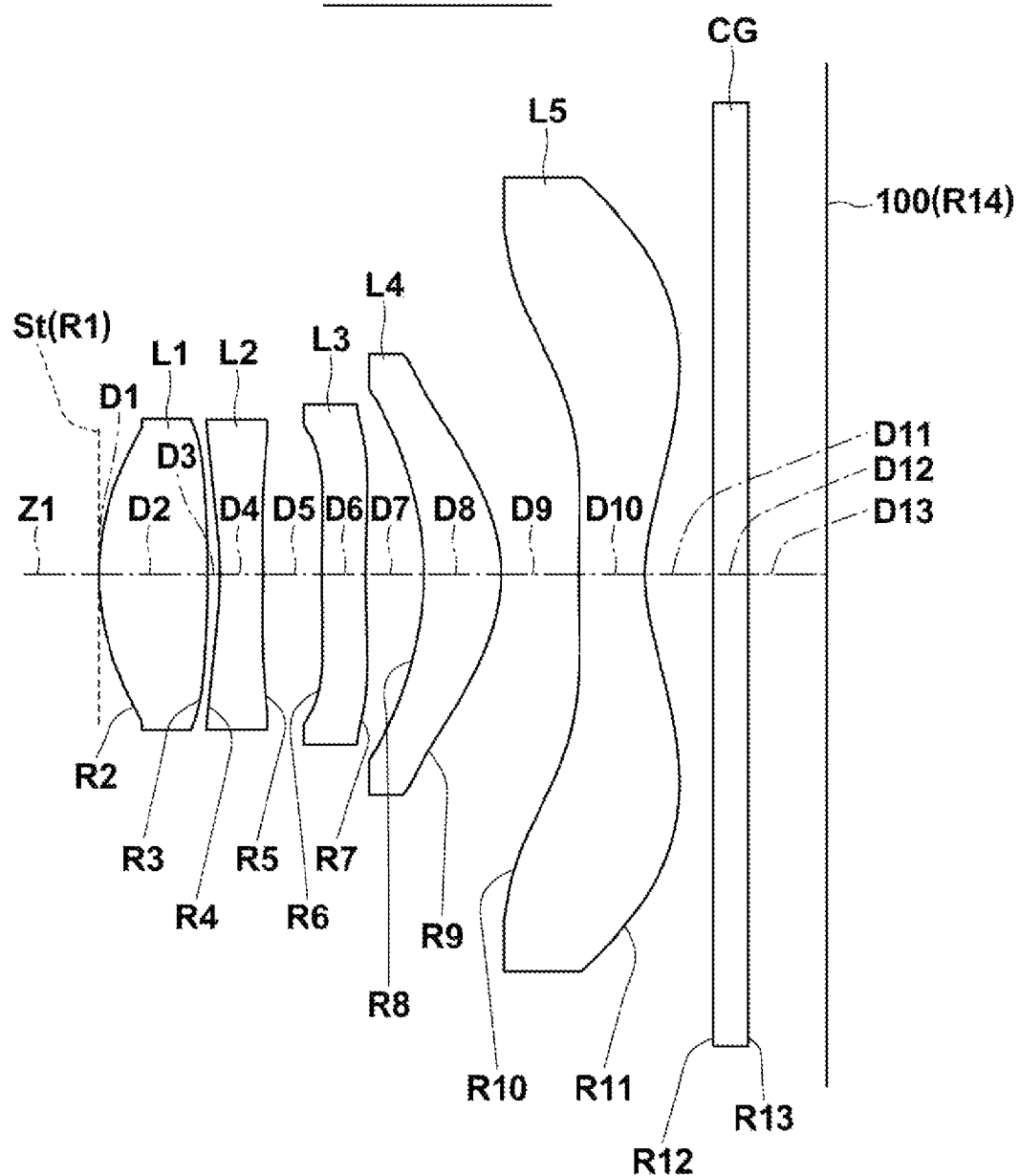
FIG. 3 is a cross-sectional view of an imaging lens according to one embodiment of the present invention, illustrating a third configuration example which corresponds to Example 3.
Figure 4:
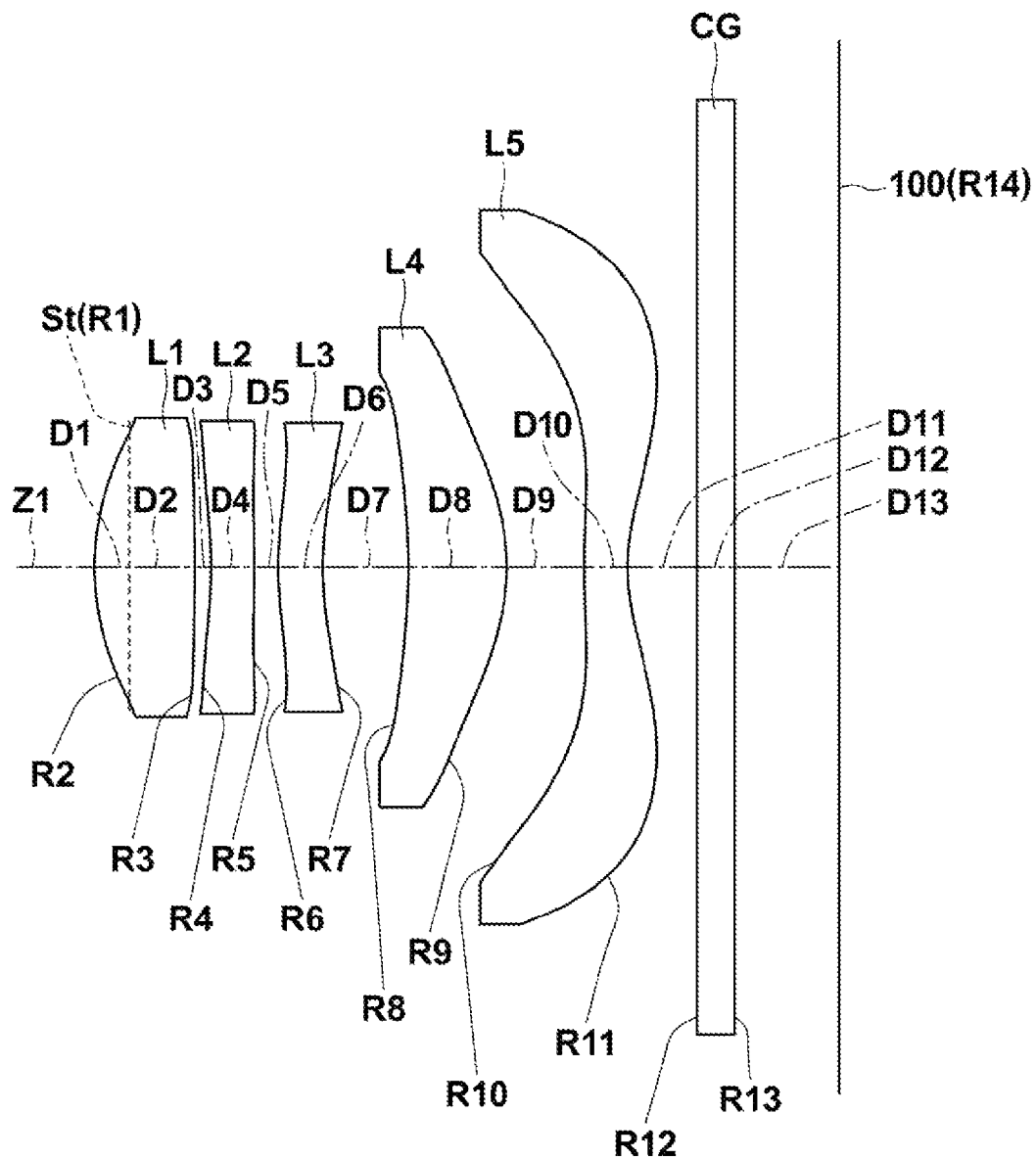
FIG. 4 is a cross-sectional view of an imaging lens according to one embodiment of the present invention, illustrating a fourth configuration example which corresponds to Example 4.
Figure 5:
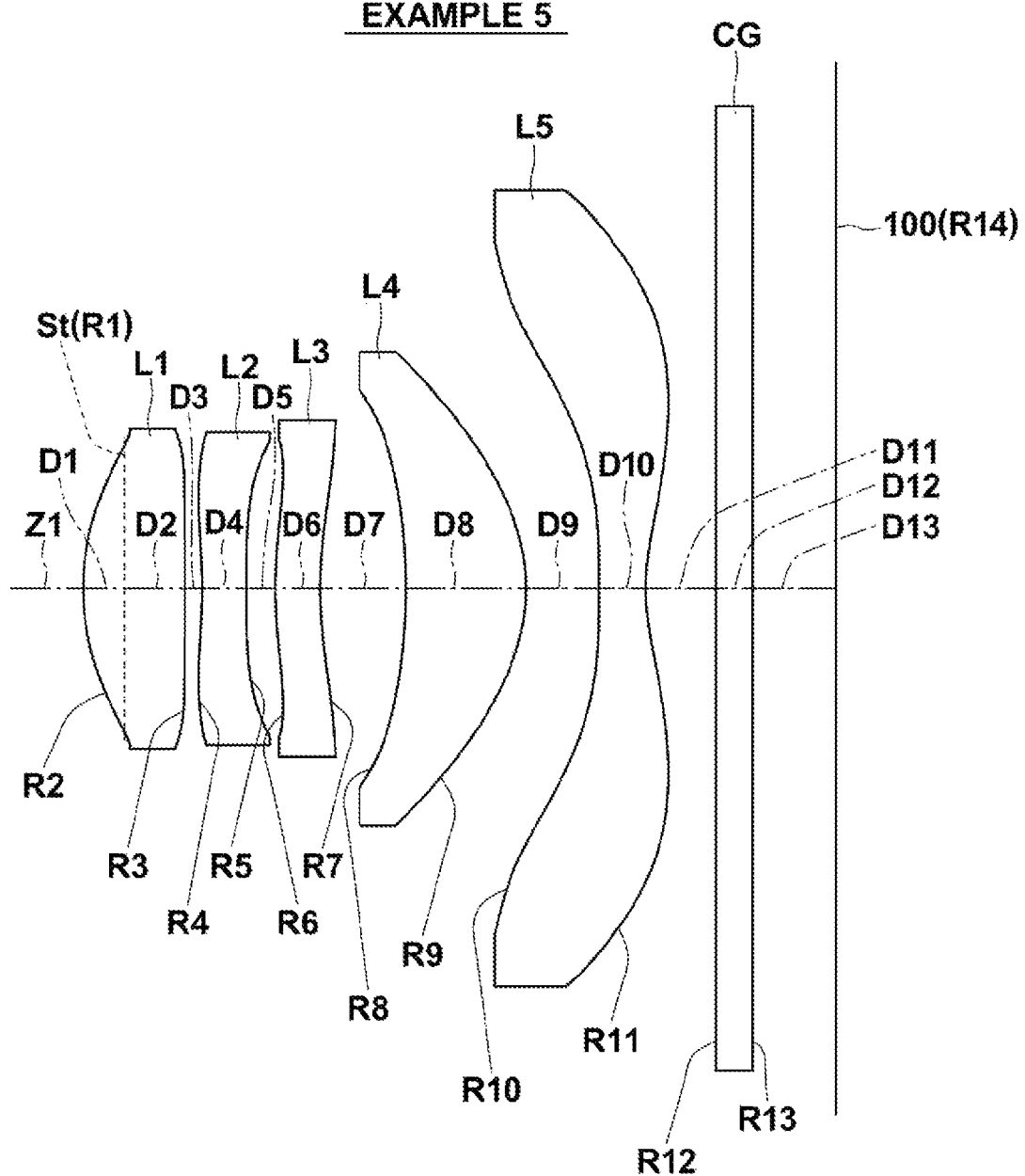
FIG. 5 is a cross-sectional view of an imaging lens according to one embodiment of the present invention, illustrating a fifth configuration example which corresponds to Example 5.
Figure 6:
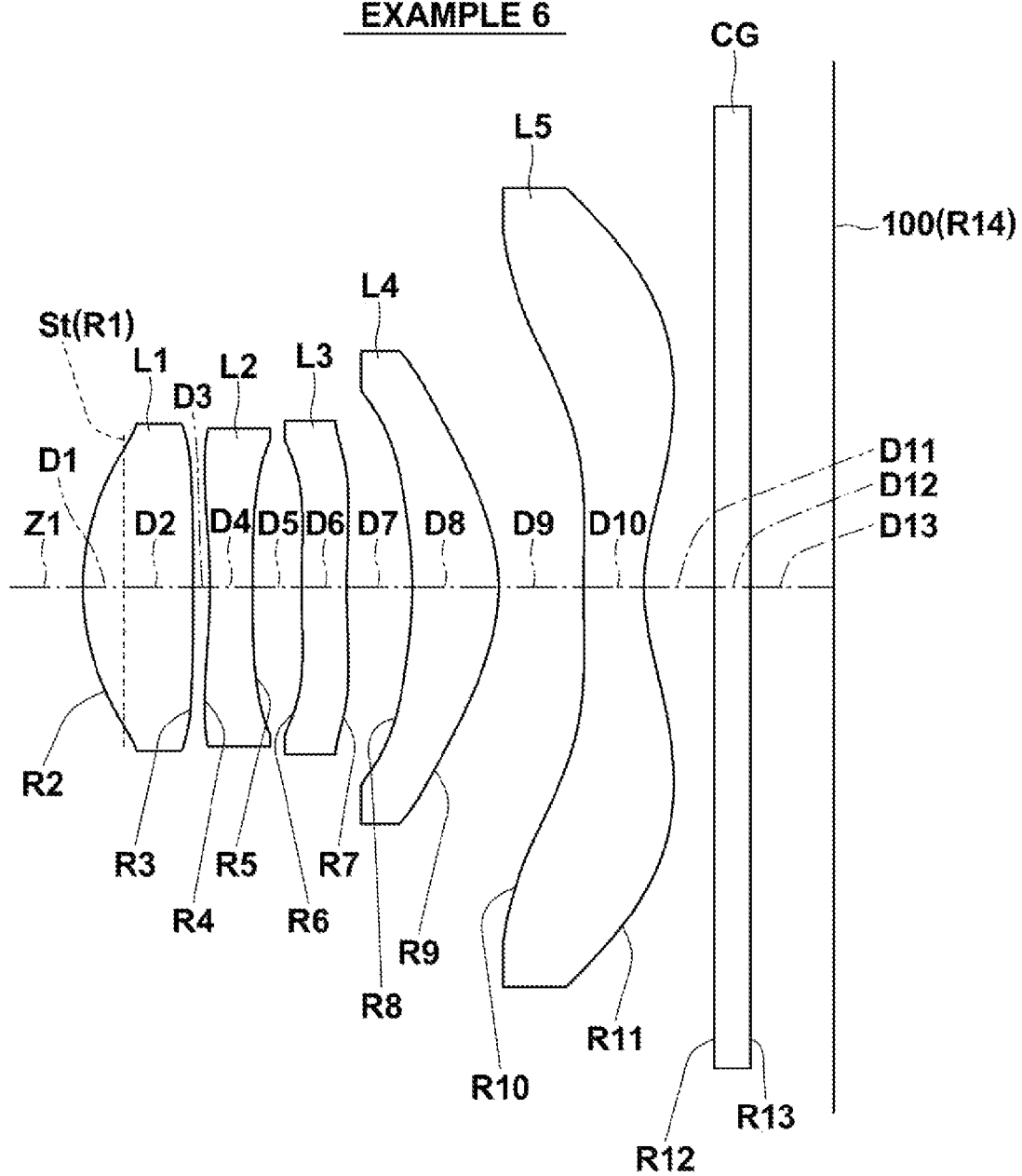
FIG. 6 is a cross-sectional view of an imaging lens according to one embodiment of the present invention, illustrating a sixth configuration example which corresponds to Example 6.
Figure 7:
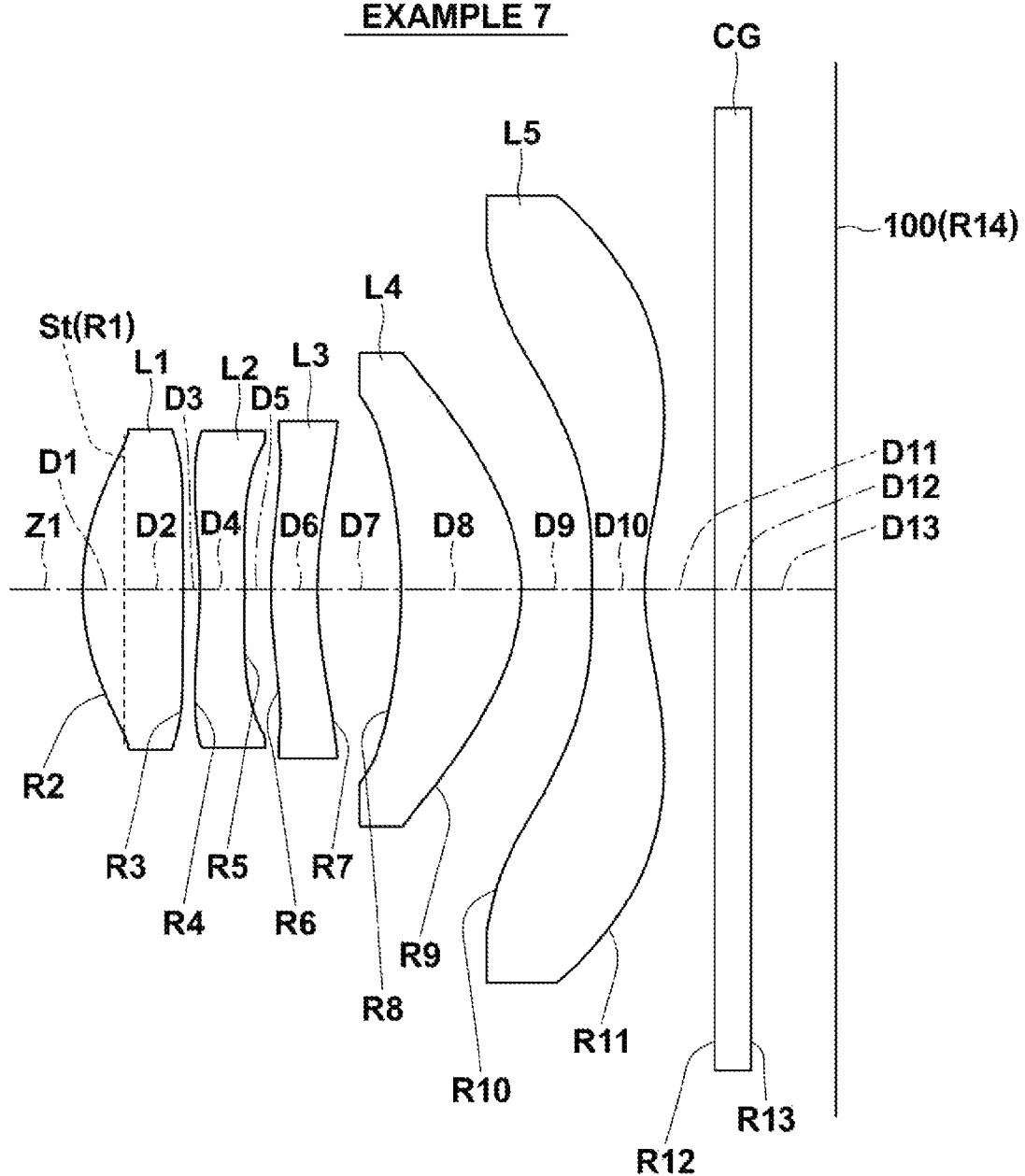
FIG. 7 is a cross-sectional view of an imaging lens according to one embodiment of the present invention, illustrating a seventh configuration example which corresponds to Example 7.
Figure 8:
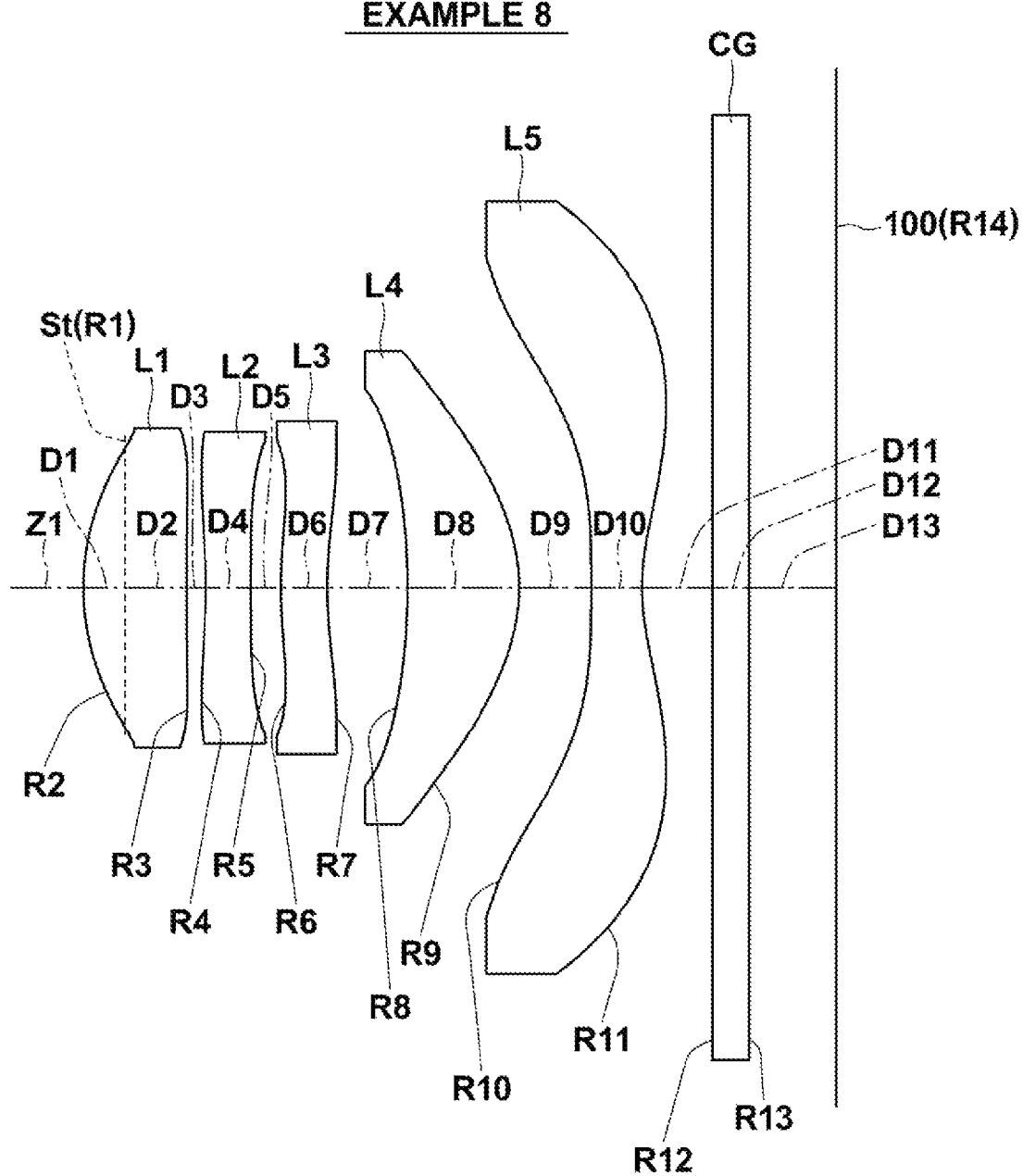
FIG. 8 is a cross-sectional view of an imaging lens according to one embodiment of the present invention, illustrating an eight configuration example which corresponds to Example 8.
Figure 9:
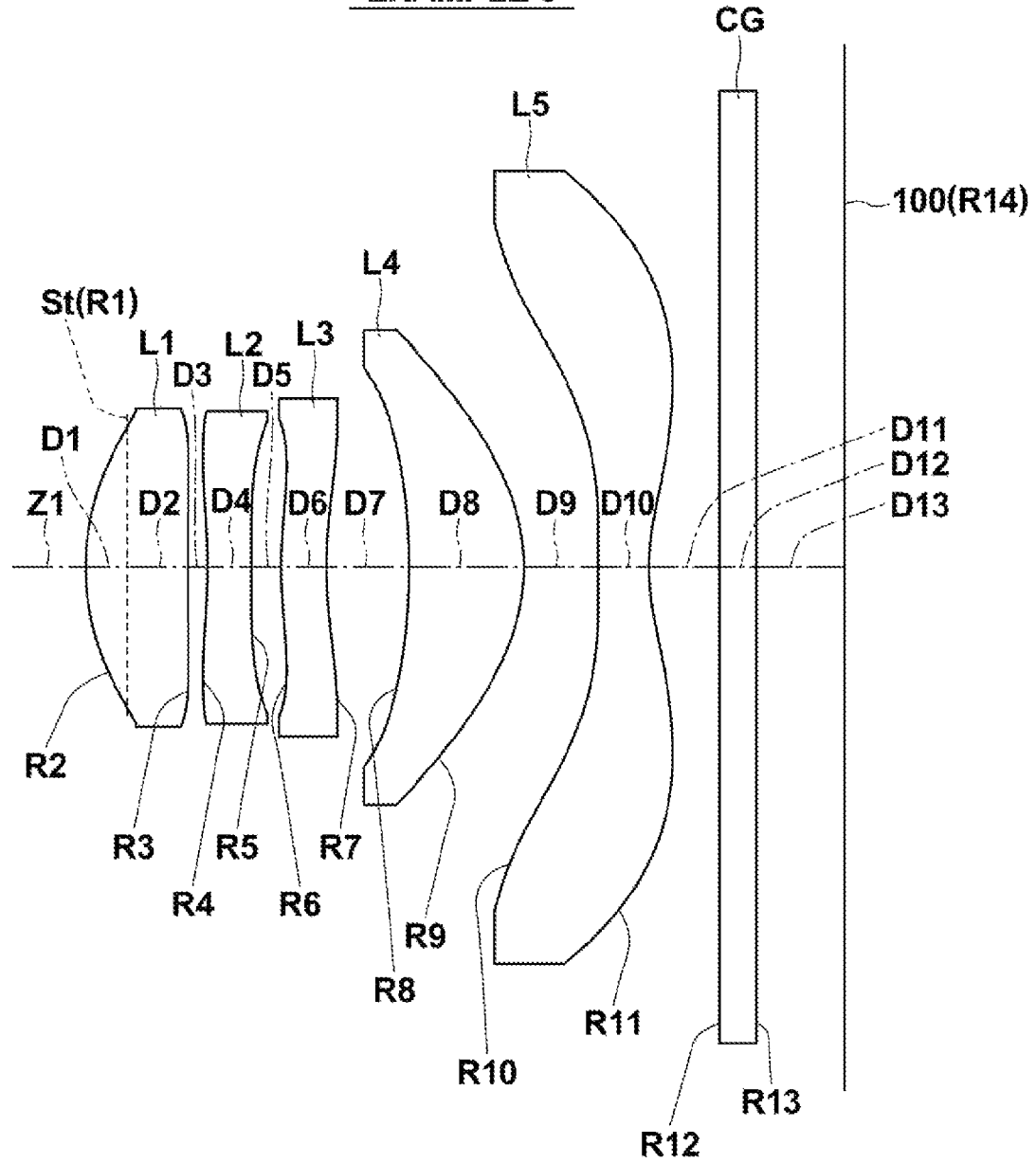
FIG. 9 is a cross-sectional view of an imaging lens according to one embodiment of the present invention, illustrating a ninth configuration example which corresponds to Example 9.
Figure 10:
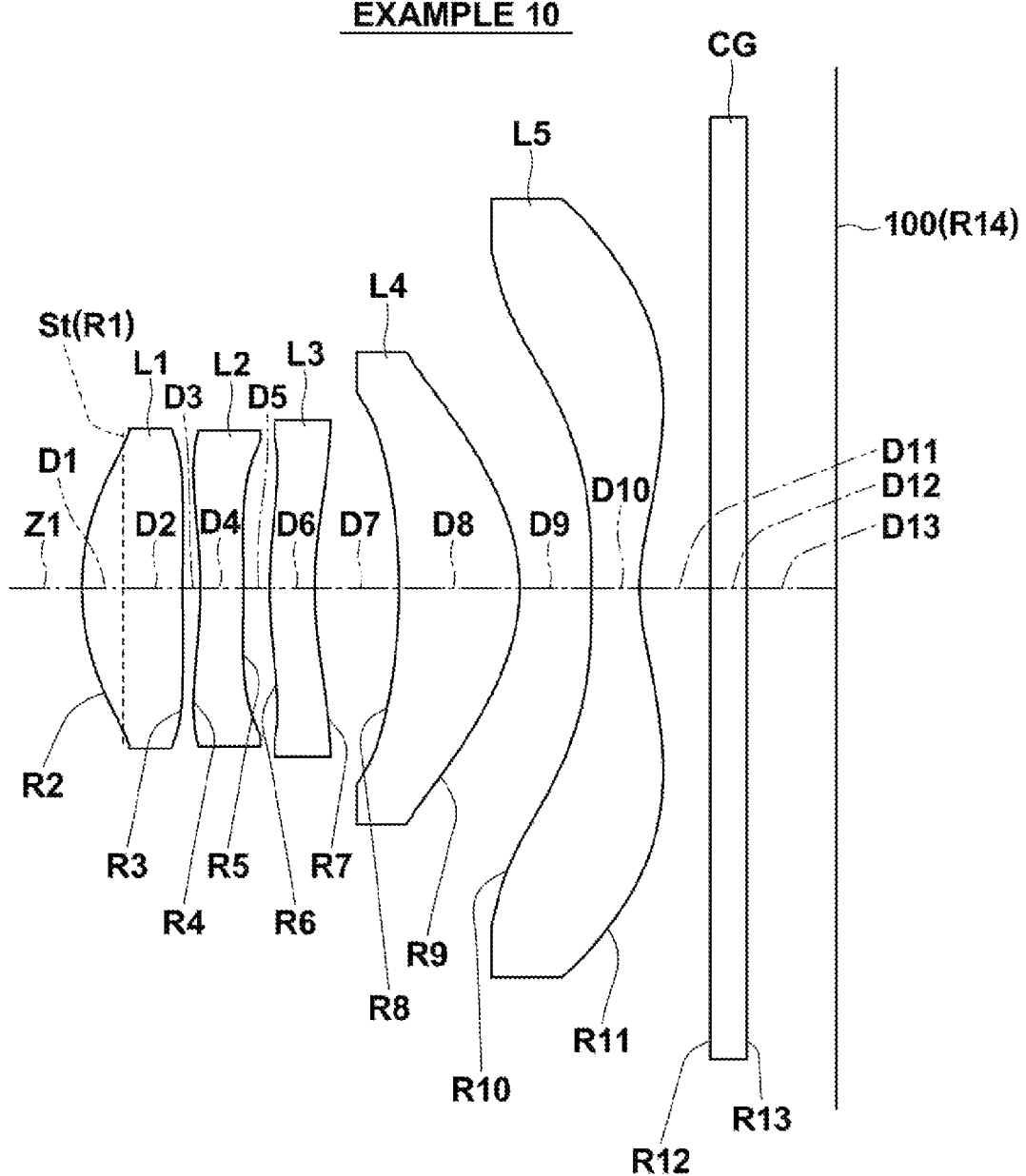
FIG. 10 is a cross-sectional view of an imaging lens according to one embodiment of the present invention, illustrating a tenth configuration example which corresponds to Example 10.
Figure 11:
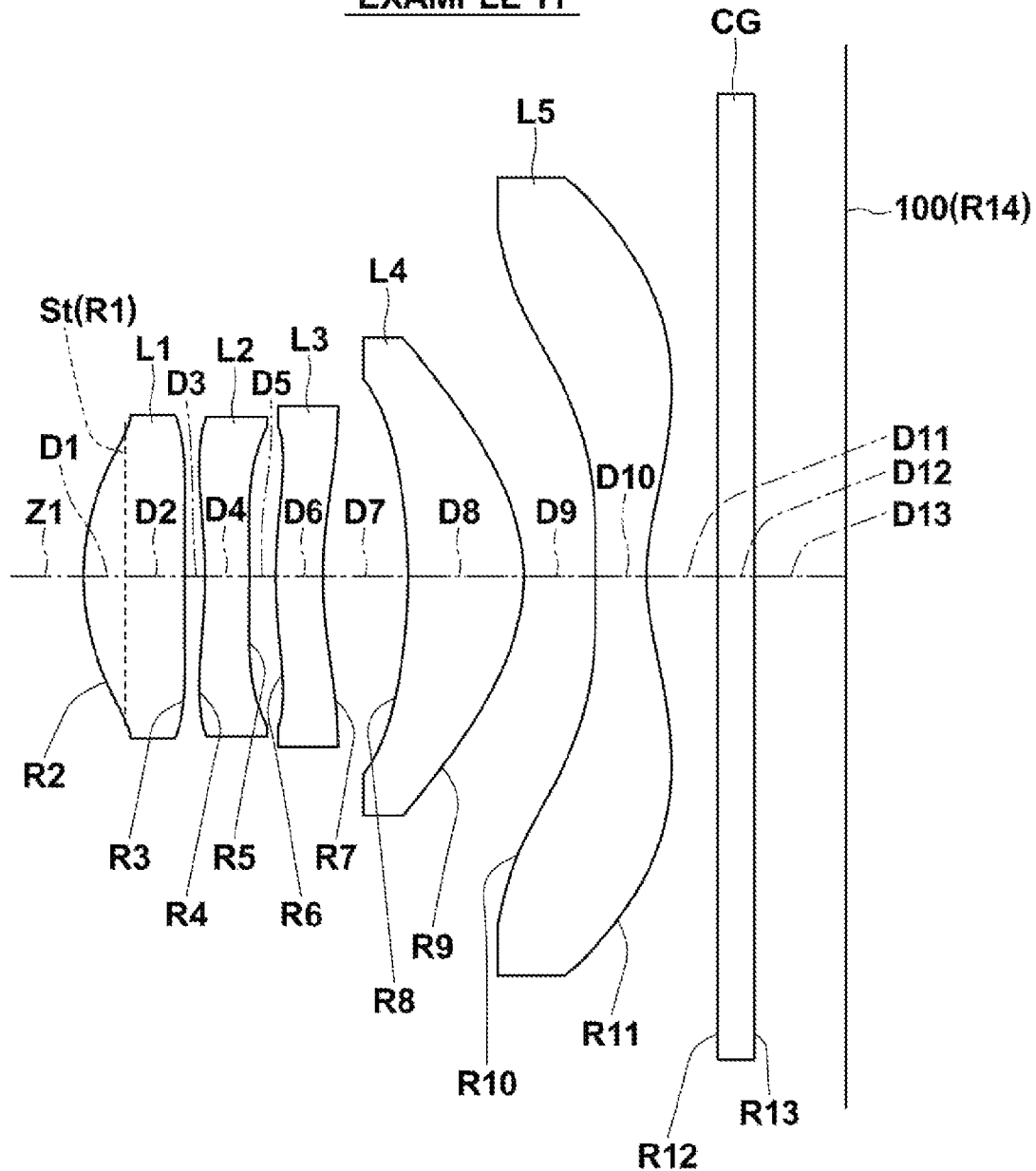
FIG. 11 is a cross-sectional view of an imaging lens according to one embodiment of the present invention, illustrating an eleventh configuration example which corresponds to Example 11.
Figure 12:
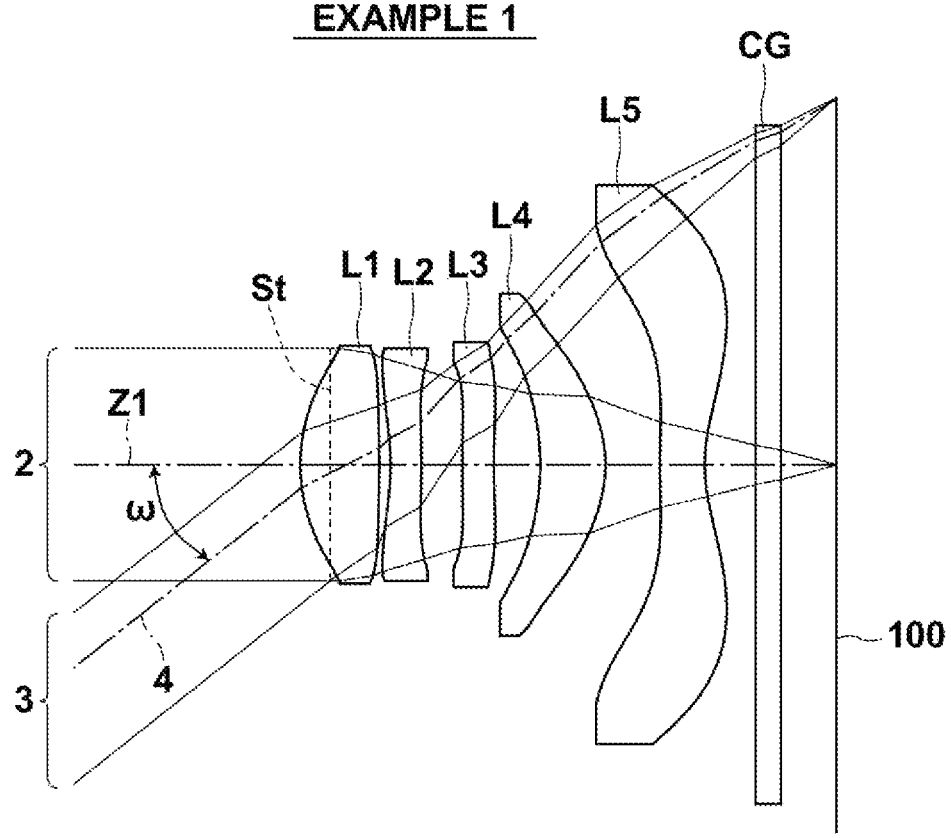
FIG. 12 is a ray diagram of the imaging lens illustrated in FIG. 1.

FIG. 1 illustrates a first configuration example of an imaging lens according to a first embodiment of the present invention. This configuration example corresponds to the lens configuration of a first numerical example (Tables 1 and 2) to be described later. Likewise, second to eleventh cross-sectional configuration examples corresponding to numerical examples (Tables 3 to 22) according to the second to the eleventh embodiments, to be described later, are shown in FIGS. 2 to 11 respectively. In FIGS. 1 to 11, the symbol Ri indicates a radius of curvature of $i^{th}$ surface in which a number i (i=1, 2, 3 - - - ) is given to each surface in a serially increasing manner toward the image side with the most object side lens element surface being taken as the first surface. The symbol Di indicates a surface distance on the optical axis Z1 between $i^{th}$ surface and $(i+1)^{th}$ surface. As the basic configuration of each configuration example is identical, a description will be made, hereinafter, based on the configuration example of imaging lens shown in FIG. 1, and the configuration examples shown in FIGS. 2 to 11 will be described, as required. FIG. 12 is a ray diagram of the imaging lens shown in FIG. 1, illustrating each optical path of an axial light beam 2 and a light beam 3 of the maximum angle of view from a point at infinity, and the maximum half angle of view ω. A principal ray 4 of the maximum angle of view is illustrated in the light beam 3 of the maximum angle of view by a dash-dot line.

An imaging lens L according to an embodiment of the present invention may preferably be used in various types of imaging devices and systems that use image sensors such as, for example, CCDs and CMOSs, in particular, relatively small portable terminal devices and systems, including digital still cameras, camera-equipped portable phones, smartphones, tablet terminals, and PDAs. The imaging lens L includes a first lens L1, a second lens L2, a third lens L3, a fourth lens L4, and a fifth lens L5, disposed in order from the object side along the optical axis Z1.

Figure 24:
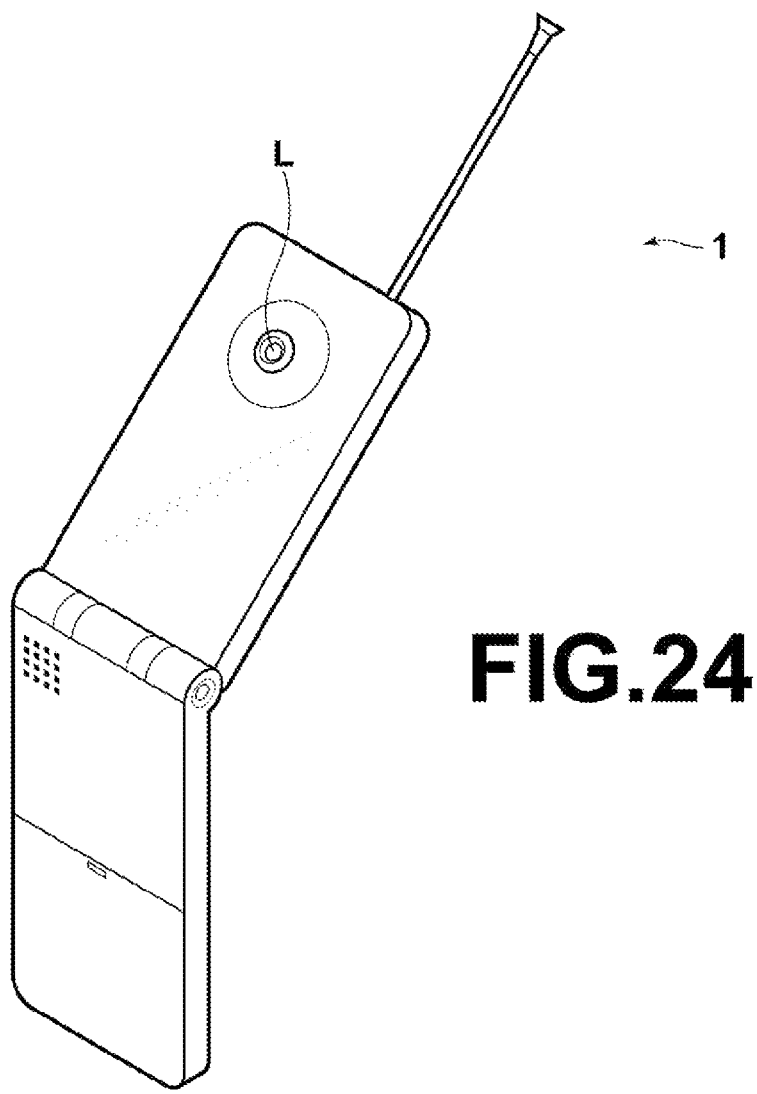
FIG. 24 illustrates an imaging apparatus, which is a portable phone terminal, equipped with the imaging lens of the present invention.

FIG. 24 is a schematic view of a portable phone terminal which is an imaging apparatus 1 according to an embodiment of the present invention. The imaging apparatus 1 includes the imaging lens L according to the present embodiment and an image sensor 100 (FIGS. 1 to 11), such as a CCD, that outputs an imaging signal according to an optical image formed by the imaging lens L. The image sensor 100 is disposed on the imaging surface of the imaging lens L.

Figure 25:
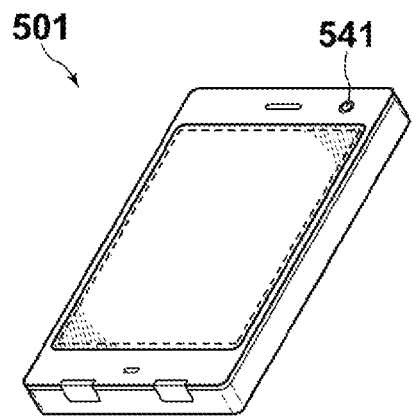
FIG. 25 illustrates an imaging apparatus, which is a smartphone, equipped with the imaging lens of the present invention.

FIG. 25 is a schematic view of a smartphone which is an imaging apparatus 501 according to an embodiment of the present invention. The imaging apparatus 501 according to an embodiment of the present invention includes a camera section 541 which includes the imaging lens L according to the present embodiment and an image sensor 100 (FIG. 1), such as a CCD, that outputs an imaging signal according to an optical image formed by the imaging lens L. The image sensor 100 is disposed on the imaging surface of the imaging lens L.

Various types of optical members CG may be disposed between the fifth lens L5 and the image sensor 100 according to the camera side structure to which the lens is mounted. For example, a plate-like optical member, for example, a cover glass for protecting the imaging surface or an infrared cut filter may be disposed. In this case, for example, a plate-like cover glass with a coating having a filtering effect, such as an infrared cut filter or an ND filter, or with a material having an identical effect may be used as the optical member CG.

Further, an effect comparable to that of the optical member CG may be given by applying a coating on the fifth lens L5, without using the optical member CG. This allows the reduction in the number of parts and overall length.

Preferably, the imaging lens L includes an aperture stop St disposed on the object side of the object side surface of the first lens L1. The disposition of the aperture stop St in such a manner may prevent the incident angle of a light ray passing through the optical system with respect to the imaging surface (image sensor) from increasing, in particular, in a peripheral portion of the imaging area. The term "disposed on the object side of the object side surface of the first lens L1" as used herein refers to that the position of the aperture stop St in an optical axis direction is located at the same position as the intersection between the axial marginal ray and the object side surface of the first lens L1 or on the object side of the intersection.

Further, in the case in which the aperture stop St is disposed on the object side of the object side surface of the first lens L1 in an optical axis direction, the aperture stop St is preferably disposed on the image side of the surface vertex of the object side surface of the first lens L1. The disposition of the aperture stop St on the image side of the surface vertex of the object side surface of the first lens L1 in this way allows the overall length of the imaging lens L, including the aperture stop St, to be reduced. The imaging lens L according to each of the first, second, and fourth to eleventh embodiments is a configuration example in which the aperture stop St is disposed on the object side of the object side surface of the first lens L1 and on the image side of the surface vertex of the object side surface of the first lens L1. The imaging lens L according to the third embodiment is a configuration example in which the aperture stop St is disposed on the object side of the object side surface of the first lens L1 and at the same position as that of the surface vertex of the object side surface of the first lens L1 in an optical axis direction. But, it is possible to dispose the aperture stop St on the object side of the surface vertex of the object side surface of the first lens L1. Disposition of the aperture stop St on the object side of the surface vertex of the object side surface of the first lens L1 is somewhat disadvantageous for ensuring peripheral illumination in comparison with the case in which the aperture stop St is disposed on the image side of the surface vertex of the object side surface of the first lens L1, but the incident angle of a light ray passing through the optical system with respect to the imaging surface (image sensor) may be prevented more favorably from increasing in a peripheral portion of the imaging area. The aperture stop St shown in each of FIGS. 1 to 12 does not necessarily represent the size or the shape but indicates the position on the optical axis Z1.

In the imaging lens L, the first lens L1 has a positive refractive power near the optical axis. This is advantageous for reducing the overall lens length. Further, the first lens L1 has a convex surface on the object side near the optical axis. This allows the first lens L1 that assumes major image forming function of the imaging lens L to have a sufficient positive refractive power, whereby the overall lens length may be reduced more favorably. The first lens L1 may have a biconvex shape near the optical axis or a meniscus shape with a convex surface on the object side near the optical axis. Formation of the first lens L1 in a biconvex shape near the optical axis allows the second lens L2 having a concave surface on the object side near the optical axis to be disposed adjacently on the image side of the first lens L1, whereby spherical aberration may be corrected satisfactorily. Formation of the first lens L1 in a meniscus shape with a convex surface on the object side near the optical axis allows the rear principal point to be positioned more object side, whereby the overall lens length may be reduced more favorably.

The second lens L2 has a negative refractive power near the optical axis. Further, the second lens L2 has a concave surface on the object side near the optical axis. This allows spherical aberration and chromatic aberration to be corrected satisfactorily. The second lens L2 may have a meniscus shape with a concave surface on the object side near the optical axis or a biconcave shape near the optical axis. Formation of the second lens L2 in a meniscus shape with a concave surface on the object side near the optical axis may likely prevent over correction of astigmatism when correcting spherical aberration. Formation of the second lens L2 in a biconcave shape near the optical axis allows the negative power of the second lens L2 to be borne by the image side surface, whereby the generation of high order spherical aberration may likely be prevented.

Further, the object side surface of the second lens L2 preferably has an aspherical shape having at least one inflection point located inward in a radial direction from the intersection between the object side surface and an axial marginal ray toward the optical axis. In this case, the object side surface of the second lens L2 may be formed in a convex shape on the object side at a peripheral portion, whereby the generation of high order spherical aberration may be prevented favorably. The term "inward in a radial direction from the intersection between the object side surface and an axial marginal ray toward the optical axis" as used herein refers to the same position as the intersection between the object side surface and an axial marginal ray or a position further inward in a radial direction from the intersection toward the optical axis. The inflection point may be disposed on the object side surface of the second lens L2 at a position corresponding to the intersection between the object side surface and an axial marginal ray or at any position further inward in a radial direction from the intersection toward the optical axis.

The third lens L3 has a negative refractive power near the optical axis. This allows spherical aberration and chromatic aberration to be corrected satisfactorily. The third lens L3 has a meniscus shape with a convex surface on the object side. Therefore, the overall lens length may be reduced favorably by the convex shape in the meniscus shape of the third lens L3.

Further, the object side surface of the third lens L3 preferably has an aspherical shape having at least one inflection point located inward in a radial direction from the intersection between the object side surface and an axial marginal ray toward the optical axis. In this case, the object side surface of the third lens L3 may be formed in a concave shape on the object side at a peripheral portion, whereby the generation of astigmatism at a high angle of view may be prevented favorably. The inflection point may be disposed on the object side surface of the third lens L3 at a position corresponding to the intersection between the object side surface and an axial marginal ray or at any position further inward in radial direction from the intersection toward the optical axis.

The fourth lens L4 has a positive refractive power near the optical axis. In this case, the incident angle of a light ray passing through the optical system with respect to the imaging surface (image sensor) is prevented from increasing, in particular, at an intermediate angle of view. The fourth lens L4 has a meniscus shape with a concave surface on the object side near the optical axis. This allows astigmatism to be corrected satisfactorily.

The fifth lens L5 has a negative refractive power near the optical axis. This allows the overall lens length to be reduced favorably and field curvature to be corrected satisfactorily. The fifth lens L5 has a concave surface on the image side near the optical axis. This is more advantageous for correcting field curvature. The fifth lens L5 may have a meniscus shape with a concave surface on the image side near the optical axis or a biconcave shape near the optical axis. Formation of the fifth lens L5 in a meniscus shape with a concave surface on the image side near the optical axis allows the overall lens length to be reduced favorably. Formation of the fifth lens L5 in a biconcave shape near the optical axis allows the negative power of the fifth lens L5 to be borne by the object side surface, whereby the incident angle of a light ray passing through the optical system with respect to the imaging surface (image sensor) may be prevented from increasing in the range from the center to an intermediate angle of view.

The image side surface of the fifth lens L5 has an aspherical shape having at least one inflection point located inward in a radial direction from the intersection between the image side surface and a principal ray of the maximum angle of view toward the optical axis. This allows the incident angle of a light ray passing through the optical system with respect to the imaging surface (image sensor) to be prevented from increasing, in particular, in a peripheral portion of the imaging area. Further, formation of the image side surface of the fifth lens L5 in an aspherical shape having at least one inflection point located inward in a radial direction from the intersection between the image side surface and a principal ray of the maximum angle of view toward the optical axis allows distortion to be corrected satisfactorily. The term "inward in a radial direction from the intersection between the image side surface and a principal ray of the maximum angle of view toward the optical axis" as used herein refers to the same position as the intersection between the image side surface and principal ray of the maximum angle of view or a position further inward in a radial direction from the intersection toward the optical axis. The inflection point on the image side of the fifth lens L5 may be disposed at a position corresponding to the intersection between the image side surface and a principal ray of the maximum angle of view or at any position further inward in a radial direction from the intersection toward the optical axis.

Preferably, each of the first lens L1 to the fifth lens L5 of the imaging lens L has an aspherical shape on at least either one of the sides for performance improvement.

Further, the first lens L1 to the fifth lens L5 are preferably not cemented lenses but single lenses. The use of single lenses for all of the lenses may increase the number of lens surfaces contacting the air in comparison with the case in which a cemented lens is used for any of the lenses and design flexibility is increased, thereby allowing reduction in overall lens length, increase in angle of view, and a smaller F-number to be realized more easily.

In particular, the first lens L1 and the second lens L2 are preferably not cemented and an air space is provided between them. In order to realize a small F-number, spherical aberration control is required, and the provision of an air space between the first lens L1 and the second lens L2 allows high order aberration to be controlled easily, whereby the spherical aberration may also be controlled easily.

Next, operations and effects of the imaging lens L configured in the manner described above with respect to conditional expressions will be described in further detail. Preferably, the imaging lens L satisfies any one or any combination of the conditional expressions given below. Preferably, a conditional expression to be satisfied by the imaging lens L is selected, as appropriate, according to the requirements of the imaging lens L.

First, the focal length f1 of the first lens L1 and the focal length f of the entire system preferably satisfy a conditional expression (1) given below:

$$0.91 < f/f1 < 2.47 \quad (1).$$

The conditional expression (1) defines a preferable numerical range of the ratio of the focal length f of the entire system to the focal length f1 of the first lens L1. Assurance of the refractive power for the first lens L1 such that the optical system does not fall to or below the conditional expression (1) allows the positive refractive power of the first lens L1 to be prevented from decreasing excessively with respect to the refractive power of the entire system, whereby the overall lens length may be reduced favorably. Configuration of the optical system so as not to fall to or below the lower limit of the conditional expression (1) allows the ratio of the overall lens length to the focal length of the entire system to be reduced. Note that the ratio of the overall lens length to the focal length of the entire system may be expressed, using the aforementioned f and TTL to be described later, as TTL/f. Suppression of the refractive power of the first lens L1 such that the optical system does not reach or exceed the upper limit of the conditional expression (1) allows the positive refractive power of the first lens L1 to be prevented from increasing excessively with respect to the refractive power of the entire system, whereby spherical aberration and astigmatism may be corrected satisfactorily. Further, the satisfactory correction of spherical aberration is advantageous for reducing the F-number. In order to further enhance the effects of the conditional expression (1) described above, the optical system preferably satisfies a conditional expression (1-1), more preferably satisfies a conditional expression (1-2) and further preferably satisfies a conditional expression (1-3).

$$1.1 < f/f1 < 2.05 \quad (1\text{-}1)$$

$$1.22 < f/f1 < 2.05 \quad (1\text{-}2)$$

$$1.22 < f/f1 < 1.86 \quad (1\text{-}3)$$

The focal length f5 of the fifth lens L5 and the focal length f of the entire system preferably satisfy a conditional expression (2) given below:

$$-2.13 < f/f5 < -1.03 \quad (2).$$

The conditional expression (2) defines a preferable numerical range of the ratio of the focal length f of the entire system to the focal length f5 of the fifth lens L5. Suppression of the refractive power of the fifth lens L5 such that the optical system does not fall to or below the lower limit of the conditional expression (2) allows the negative refractive power of the fifth lens L5 to be prevented from increasing excessively with respect to the refractive power of the entire system, whereby the incident angle of a light ray passing through the optical system with respect to the imaging surface (image sensor) may be prevented from increasing at an intermediate angle of view. Assurance of the refractive power for the fifth lens L5 such that the optical system does not reach or exceed the upper limit of the conditional expression (2) allow the negative refractive power of the fifth lens L5 to be prevented from decreasing excessively with respect to the refractive power of the entire system, whereby field curvature may be corrected satisfactorily. An attempt to reduce the F-number causes the center thickness of a positive lens to tend to increase, so that the back focus tends to decrease while the overall lens length tends to increase. But, the satisfaction of the conditional expression (2) is advantageous for both maintaining a back focus of an appropriate length and reducing the overall lens length when the F-number is reduced. In order to further enhance the effects of the conditional expression (2) described above, the optical system preferably satisfies a conditional expression (2-1), more preferably satisfies a conditional expression (2-2) and further preferably satisfies a conditional expression (2-3).

$$-1.9 < f/f5 < -1.13 \quad (2\text{-}1)$$

$$-1.9 < f/f5 < -1.2 \quad (2\text{-}2)$$

$$-1.81 < f/f5 < -1.2 \quad (2\text{-}3)$$

Further, the distance TTL on the optical axis from the object side surface of the first lens L1 to the image plane when the back focus is expressed in air equivalent distance and the paraxial image height (f·tan ω) preferably satisfy a conditional expression (3) given below. Here, f is the focal length of the entire system, ω is the maximum half angle of view when an object at infinity is in focus, and tan is the tangent of the trigonometric functions.

$$1.2 < TTL/(f \cdot \tan \omega) < 1.57 \quad (3).$$

The conditional expression (3) defines a preferable numerical range of the ratio of the distance TTL (overall lens length) from the object side surface of the first lens L1 to the image plane to the paraxial image height (f·tan ω). Note that the back focus (distance on the optical axis from the surface vertex of the image side surface of the fifth lens L5 to the image plane) in the overall lens length is an air equivalent length. Assurance of the distance TTL from the object side surface of the first lens L1 to the image plane with respect to the paraxial image height (f·tan ω) such that the optical system does not fall to or below the lower limit of the conditional expression (3) distortion to be corrected satisfactorily and the incident angle of a light ray passing through the optical system with respect to the imaging surface (image sensor) to be prevented from increasing, in particular, in a peripheral portion of the imaging area. Maintenance of the distance TTL from the object side surface of the first lens L1 to the image plane with respect to the paraxial image height (f·tan ω) such that the optical system does not reach or exceed the upper limit of the conditional expression (3) allows the overall lens length to the image size to be reduced favorably. Therefore, the image size may be increased while maintaining the overall lens length, which is advantageous to match the image sensor that satisfies the demand for higher pixel counts, and also advantageous to further reduce the overall lens length while maintaining the image size. In order to further enhance the effects of the conditional expression (3) described above, the optical system preferably satisfies a conditional expression (3-1), more preferably satisfies a conditional expression (3-2) and further preferably satisfies a conditional expression (3-3).

$$1.3 < TTL/(f \cdot \tan \omega) < 1.51 \qquad (3\text{-}1)$$

$$1.34 < TTL/(f \cdot \tan \omega) < 1.51 \qquad (3\text{-}2)$$

$$1.34 TTL/(f \cdot \tan \omega) < 1.49 \qquad (3\text{-}3)$$

Still further, the paraxial radius of curvature L1f of the object side surface of the first lens L1 and diameter φ of the entrance pupil preferably satisfy a conditional expression (4) given below:

$$0.5 < L1f/\phi < 0.97 \qquad (4).$$

The conditional expression (4) defines a preferable numerical range of the paraxial radius of curvature L1f of the object side surface of the first lens L1 to the diameter φ of the entrance pupil. Setting of the paraxial radius of curvature L1f of the object side surface of the first lens L1 to the diameter φ of the entrance pupil such that the optical system does not fall to or below the lower limit of the conditional expression (4) is advantageous to prevent the generation of spherical aberration. Setting of the paraxial radius of curvature L1f of the object side surface of the first lens L1 to the diameter φ of the entrance pupil such that the optical system does not reach or exceed the upper limit of the conditional expression (4) is advantageous to realize a small F-number, while reducing the overall lens length. In order to further enhance the effects of the conditional expression (4) described above, the optical system preferably satisfies a conditional expression (4-1) and more preferably satisfies a conditional expression (4-2).

$$0.65 < L1f/\phi < 0.91 \qquad (4\text{-}1)$$

$$0.75 < L1f/\phi < 0.87 \qquad (4\text{-}2)$$

Further, the focal length f of the entire system, the half angle of view ω, and the paraxial radius of curvature L5r of the image side surface of the fifth lens L5 preferably satisfy a conditional expression (5) given below:

$$1 < f \cdot \tan \omega / L5r < 3 \qquad (5).$$

The conditional expression (5) defines a preferable range of the ratio of the paraxial image height (f·tan ω) to the paraxial radius of curvature L5r of the image side surface of the fifth lens L5. Setting of the paraxial image height (f·tan ω) to the paraxial radius of curvature L5r of the image side surface of the fifth lens L5 such that the optical system does not fall to or below the lower limit of the conditional expression (5) allows the absolute value of the paraxial radius of curvature of the image side surface of the fifth lens L5, which is the most image side surface of the imaging lens, to be prevented from increasing excessively with respect to the paraxial image height (f·tan ω), whereby field curvature may be corrected sufficiently while reducing the overall lens length. If the image side surface of the fifth lens L5 is formed in an aspherical shape having a concave surface on the image side near the optical axis and at least one inflection point located inward in a radial direction from the intersection between the image side surface and a principal ray of the maximum angle of view, as illustrated in the imaging less L of each embodiment, and to satisfy the lower limit of the conditional expression (5), field curvature may be corrected satisfactorily from the central angle of view to the peripheral angle of view, which is preferable to increase the angle of view. Setting of the paraxial image height (f·tan ω) to the paraxial radius of curvature L5r of the image side surface of the fifth lens L5 such that the optical system does not reach or exceed the upper limit of the conditional expression (5) allows the absolute value of the paraxial radius of curvature of the image side surface of the fifth lens L5, which is the most image side surface of the imaging lens, to be prevented from decreasing excessively with respect to the paraxial image height (f·tan ω), whereby the incident angle of a light ray passing through the optical system with respect to the imaging surface (image sensor) from increasing, in particular, at an intermediate angle of view, and excessive correction of field curvature may be prevented.

The imaging lenses according to the embodiments of the present invention may realize higher imaging performance by satisfying, as appropriate, preferable conditions described above. The imaging apparatus according to the present embodiment is configured to output an imaging signal according to an optical image formed by the high performance imaging lens of the present embodiment. Therefore, the apparatus may obtain a wide angle and a high resolution image while the apparatus size is reduced.

One preferable configuration example of the imaging lens L that takes into account the conditional expressions described above and advantageous effects will now be described. The preferably configuration example may employ, as appropriate, preferable configurations of the imaging lens L described above.

The preferably configuration example substantially consists of five lenses, composed of a first lens L1 having a positive refractive power and a convex surface on the object side, a second lens L2 having a negative refractive power and a concave surface on the object side, a third lens L3 having a negative refractive power and a meniscus shape with a convex surface on the object side, a fourth lens L4 having a positive refractive power and a meniscus shape with a concave surface on the object side, and a fifth lens L5 having a negative refractive power and a concave surface on the image side, the image side surface having an aspherical shape with at least one inflection point located inward in a radial direction from the intersection between the image side surface and a principal ray of the maximum angle of view toward the optical axis, disposed in order from the object side, and satisfies the conditional expressions (1) to (3) described above.

According to the preferable configuration, each lens element of the first lens L1 to the fifth lens L5 is optimally formed in a five-element configuration on the whole. This allows realization of a lens system having a small F-number and high imaging performance from the central to peripheral angles of view, while achieving reduction in overall lens length with respect to image size and focal length. For example, the reduction in overall lens length with respect to image size allows a lens system having a comparable lens length to that of a conventional lens system to be used in combination with an image sensor having a large image size that meets the requirement of higher pixel counts. If a lens system is used in combination with an image sensor having a comparable image size to that of a conventional image sensor, the overall lens length of the lens system may be reduced in comparison with a conventional lens system.

Each of the imaging lenses according to the first to the eleventh embodiments has the configuration of the preferable configuration example. More specifically, if each of the first lens L1 to the fifth lens L5 of the imaging lens L is formed such that the imaging lens L has a maximum angle of view of 75 degrees or more when an object at infinity is in focus, as in the imaging lenses according to the first to the eleventh embodiments, the overall lens length with respect to image size may be reduced easily, and the imaging lens L may be applied favorably to an image sensor having a size that meets the requirement of higher resolution required, for example, for portable phones and the like. Further, if each of the first lens L1 to the fifth lens L5 of the imaging lens L is formed such that the imaging lens L has a value of 1.39 to 1.48 for the conditional expression (3) that represents the ratio of the overall lens length to the paraxial image height, as in the imaging lenses according to the first to the eleventh embodiments, the overall lens length may be reduced favorably with respect to image size, and the imaging lens L may be applied more favorably to an image sensor having a size that meets the requirement of higher pixel counts required, for example, for portable phones and the like. In contrast, the values corresponding to the conditional expression (3) of the imaging lenses described in U.S. Patent Application Publication No. 20130093942, U.S. Pat. No. 8,179,614, U.S. Patent Application Publication No. 20130050847, U.S. Patent Application Publication No. 20130077181, and Chinese Patent Publication No. 103018887 are relatively large, ranging from 1.56 to 1.91. Thus, the overall lengths of the imaging lenses are too long to be applied to image sensors that meet the requirement of higher pixel counts.

Next, specific numerical examples of imaging lenses according to the embodiments of the present invention will be described. Hereinafter, a plurality of numerical examples is described collectively.

Tables 1 and 2 to be shown later indicate specific lens data corresponding to the configuration of the imaging lens illustrated in FIG. 1. In particular, Table 1 indicates basic lens data thereof, while Table 2 indicates aspherical surface data. The surface number Si column in the lens data shown in Table 1 indicates $i^{th}$ surface number of the imaging lens according to Example 1 in which a number i (i=1, 2, 3 - - - ) is given to each surface in a serially increasing manner toward the image side with the object side surface of the most object side optical element being taken as the first surface. The radius of curvature Ri column indicates the value (mm) of radius of curvature of $i^{th}$ surface from the object side in relation to the symbol Ri given in FIG. 1. Likewise, the surface distance Di column indicates the surface distance (mm) on the optical axis between $i^{th}$ surface Si and $(i+1)^{th}$ surface Si+1. The Ndj column indicates the value of the refractive index of $j^{th}$ optical element from the object side with respect to the d-line (wavelength of 587.6 nm) and the vdj column indicates the value of the Abbe number of $j^{th}$ optical element from the object side with respect to the d-line.

Table 1 also includes the aperture stop St and the optical member CG. In Table 1, the term (St) is indicated in the surface number column of the surface corresponding to the aperture stop St in addition to the surface number, and the term (IMG) is indicated in the surface number column of the surface corresponding to the imaging surface in addition to the surface number. The sign of the radius of curvature is positive if the surface shape is convex on the object side and negative if it is convex on the image side. As various types of data, values of focal length f (mm) of the entire system, back focus Bf (mm), F-number Fno and maximum angle of view 2ω (°) when an object at infinity is in focus are given in the upper margin of each lens data. Note that the back focus Bf indicates an air equivalent value.

In the basic lens data of Table 1, a mark "*" is attached to the surface number of an aspherical surface. In the imaging lens according to Example 1, both surfaces of the first lens L1 to the fifth lens L5 all have aspherical shapes. As the radii of curvature of these aspherical surfaces, the basic lens data of Table 1 shows numerical values of radii of curvature near the optical axis (paraxial radii of curvature).

Table 2 shows aspherical surface data of the imaging lens of Example 1. In a numerical value shown as aspherical surface data, the symbol "E" indicates that the subsequent numerical value is an "exponent" to base 10 and the numerical value preceding "E" is multiplied by the numerical value represented by the exponent to base 10. For example, "1.0E-02" represents "1.0×10$^{-2}$.

As for the aspherical surface data, values of each coefficient An and KA in an aspherical surface shape formula represented by Formula (A) given below are indicated. More specifically, Z indicates the length (mm) of a vertical line from a point on the aspheric surface at a height h to a tangential plane of the vertex of the aspherical surface (plane orthogonal to the optical axis).

$$Z = \frac{C \times h^2}{1 + \sqrt{1 - KA \times C^2 \times h^2}} + \sum_n An \times h^n \quad (A)$$

where
Z: depth of the aspherical surface (mm),
h: distance from the optical axis to the lens surface (height) (mm),
C: paraxial curvature=1/R (R: paraxial radius of curvature)
An: $n^{th}$ order aspherical surface coefficient (n is an integer not less than 3), and
KA: aspherical surface coefficient.

As in the imaging lens of Example 1, specific lens data corresponding to the configurations of the imaging lenses illustrated in FIGS. 2 to 11 are given in Tables 3 to 22, as Examples 2 to 11. In the imaging lenses according to Example 1 to 11, both surfaces of the first lens L1 to the fifth lens L5 all have aspherical shapes.

Figure 13:
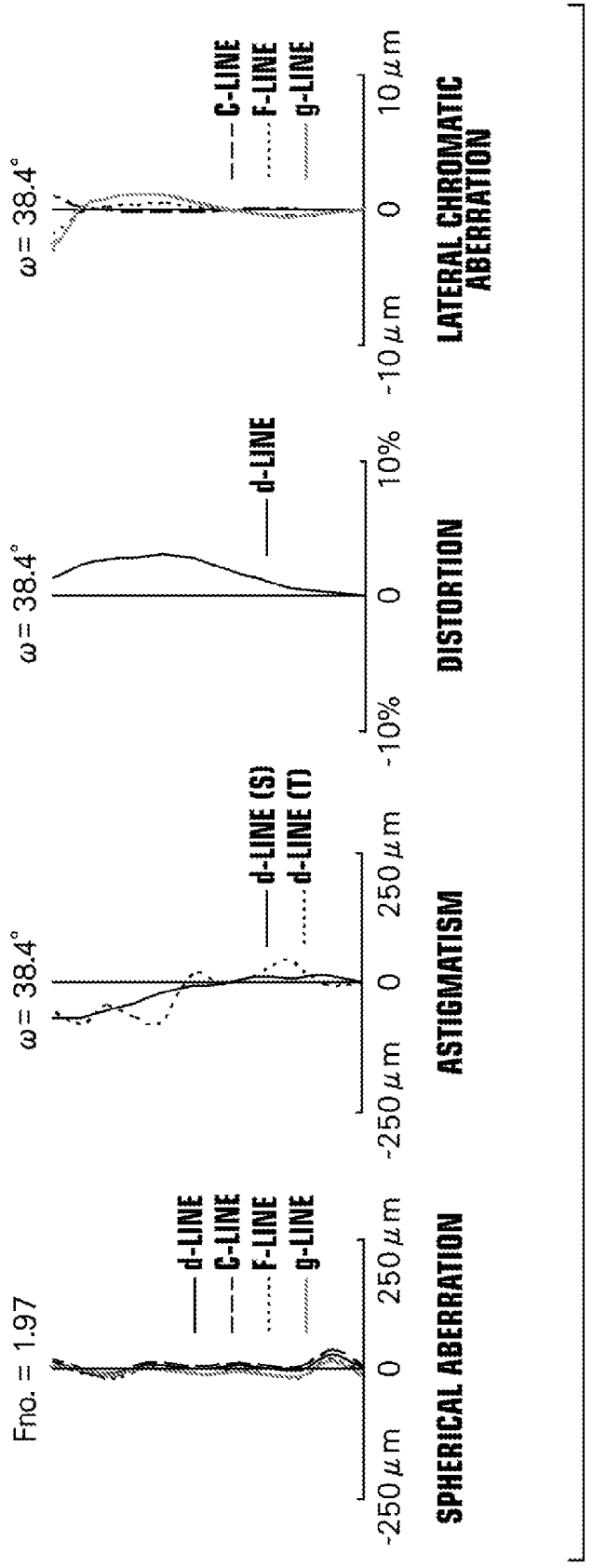
FIG. 13 shows aberration diagrams of the imaging lens of Example 1, in which diagrams of spherical aberration, astigmatism, distortion, and lateral chromatic aberration are arranged from the left in the drawing.
Figure 14:
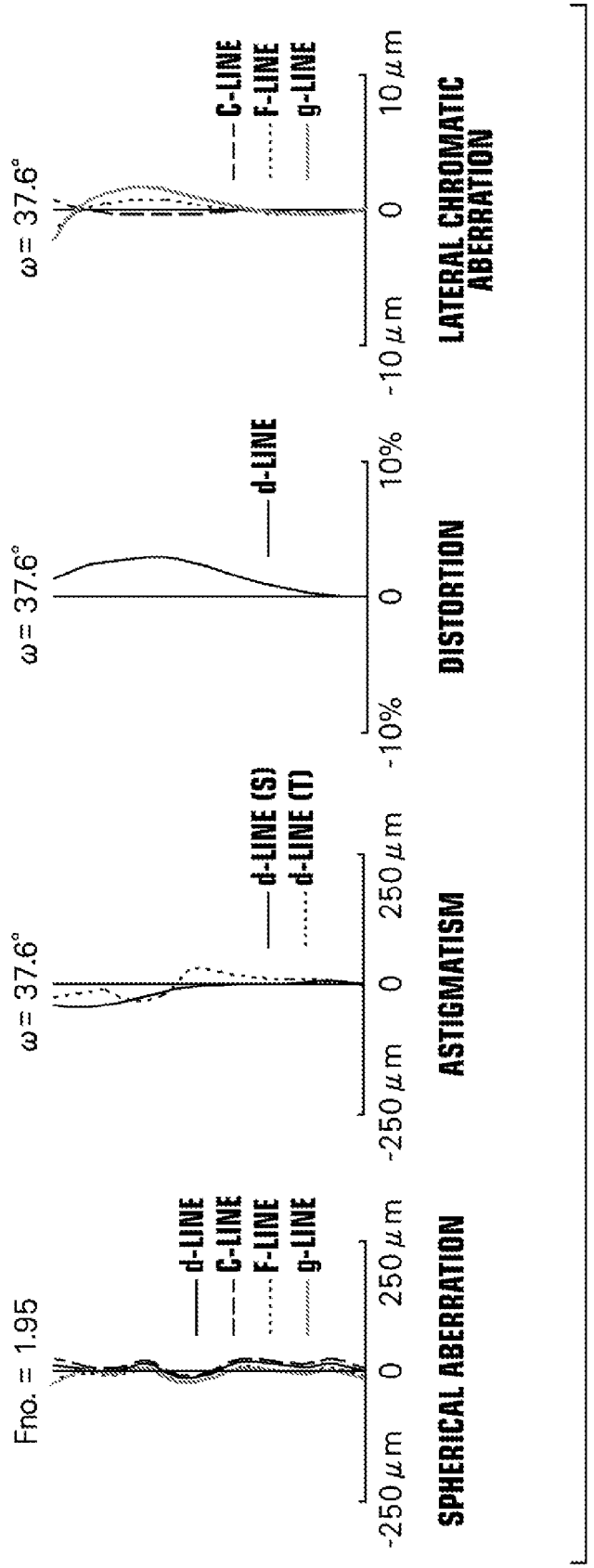
FIG. 14 shows aberration diagrams of the imaging lens of Example 2, in which diagrams of spherical aberration, astigmatism, distortion, and lateral chromatic aberration are arranged from the left in the drawing.
Figure 15:
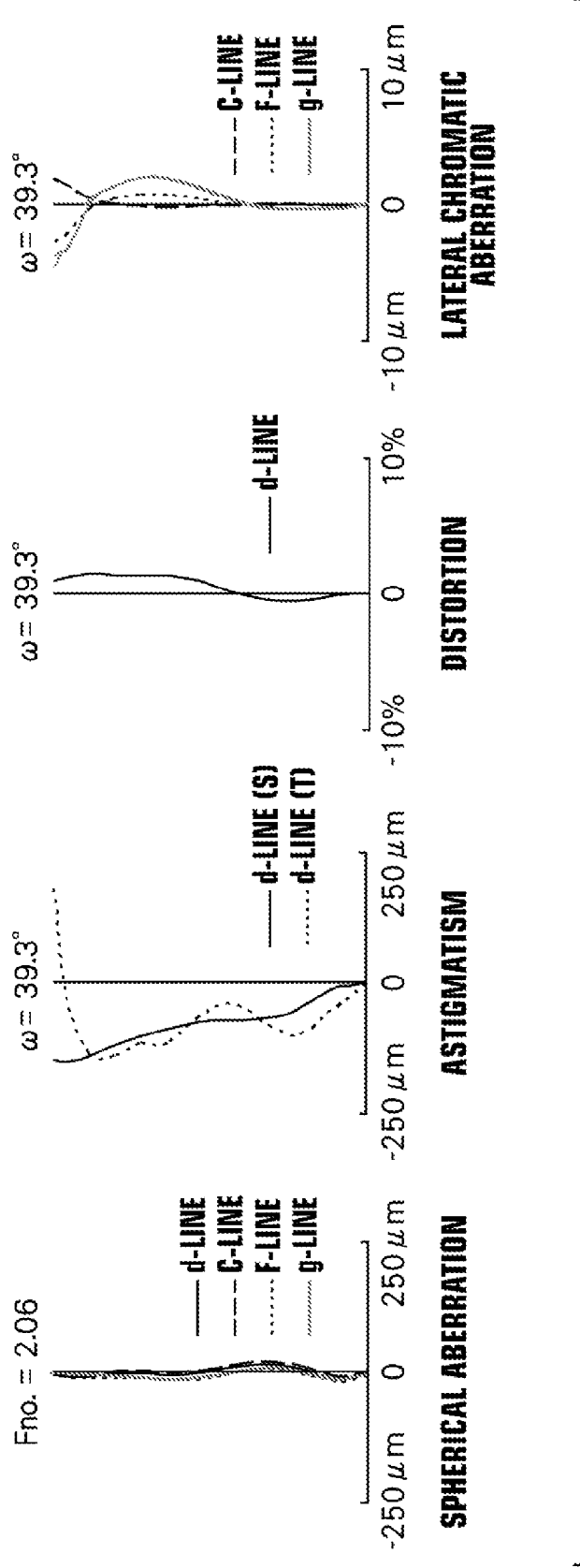
FIG. 15 shows aberration diagrams of the imaging lens of Example 3, in which diagrams of spherical aberration, astigmatism, distortion, and lateral chromatic aberration are arranged from the left in the drawing.
Figure 16:
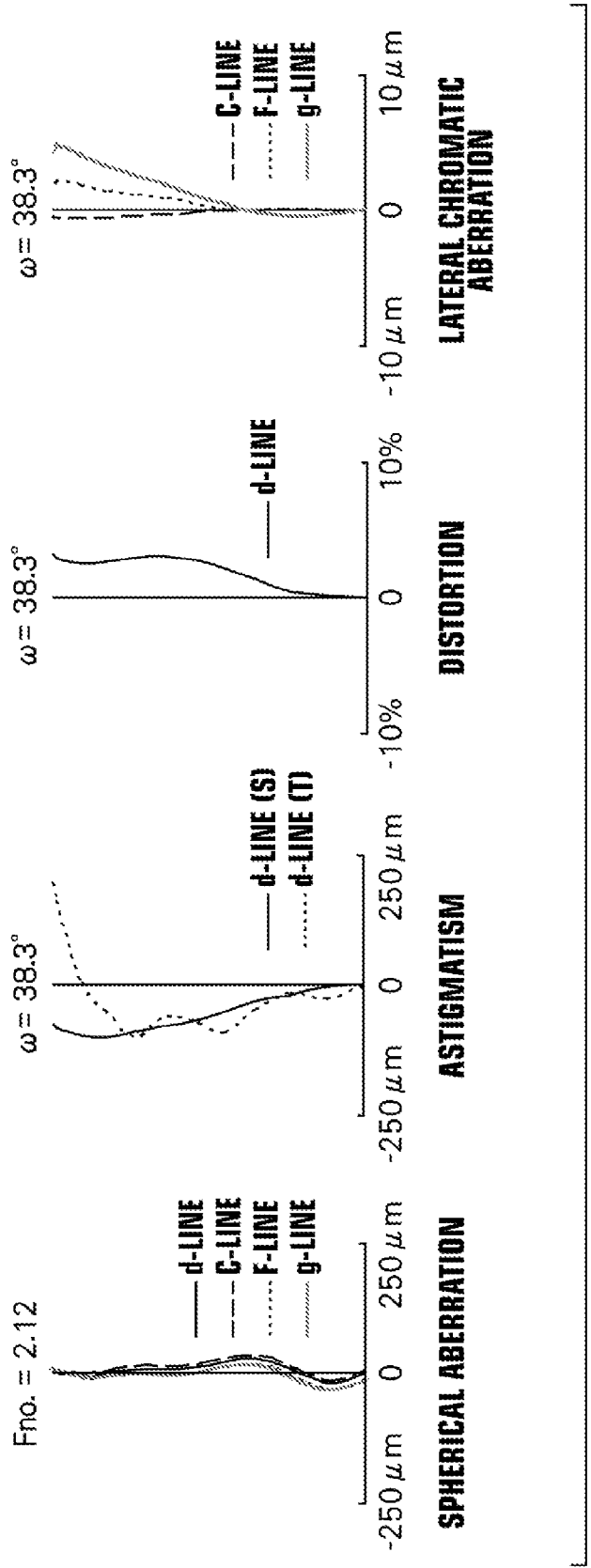
FIG. 16 shows aberration diagrams of the imaging lens of Example 4, in which diagrams of spherical aberration, astigmatism, distortion, and lateral chromatic aberration are arranged from the left in the drawing.
Figure 17:
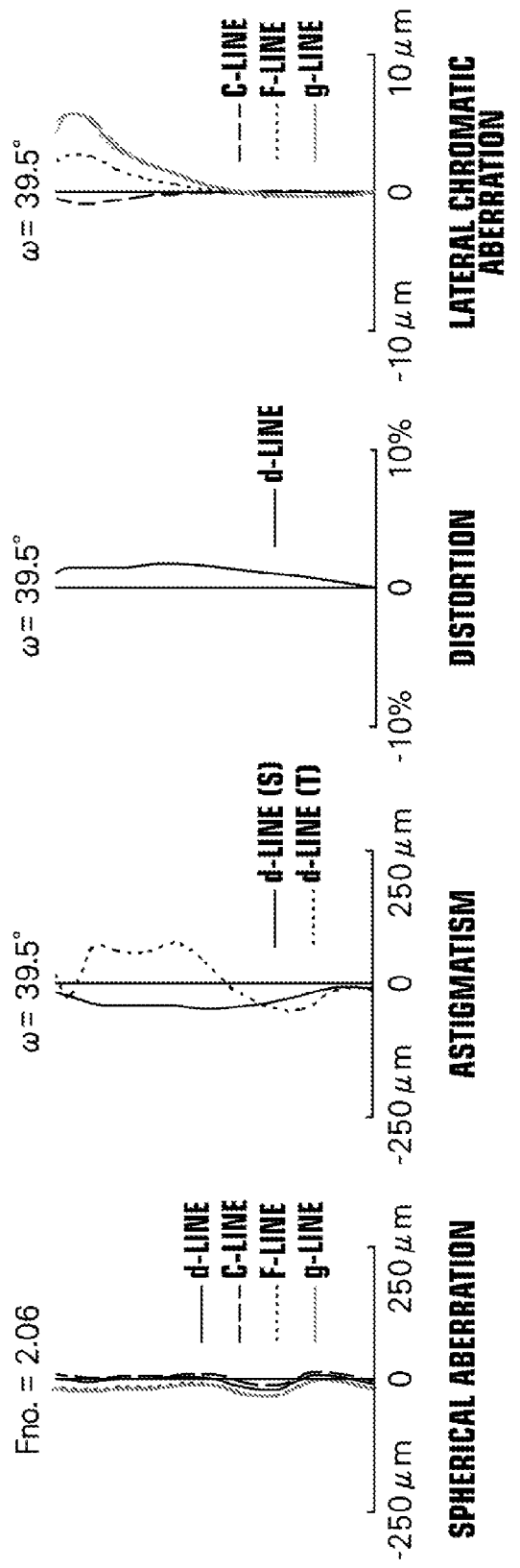
FIG. 17 shows aberration diagrams of the imaging lens of Example 5, in which diagrams of spherical aberration, astigmatism, distortion, and lateral chromatic aberration are arranged from the left in the drawing.
Figure 18:
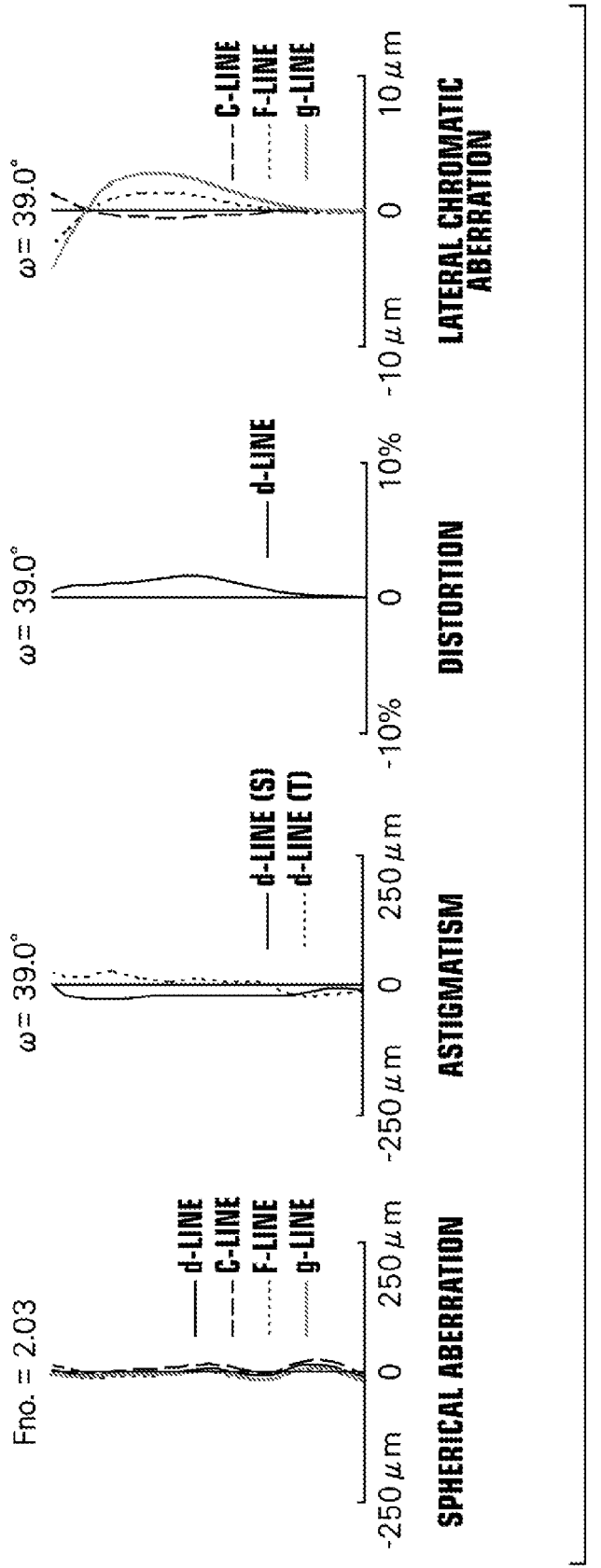
FIG. 18 shows aberration diagrams of the imaging lens of Example 6, in which diagrams of spherical aberration, astigmatism, distortion, and lateral chromatic aberration are arranged from the left in the drawing.
Figure 19:
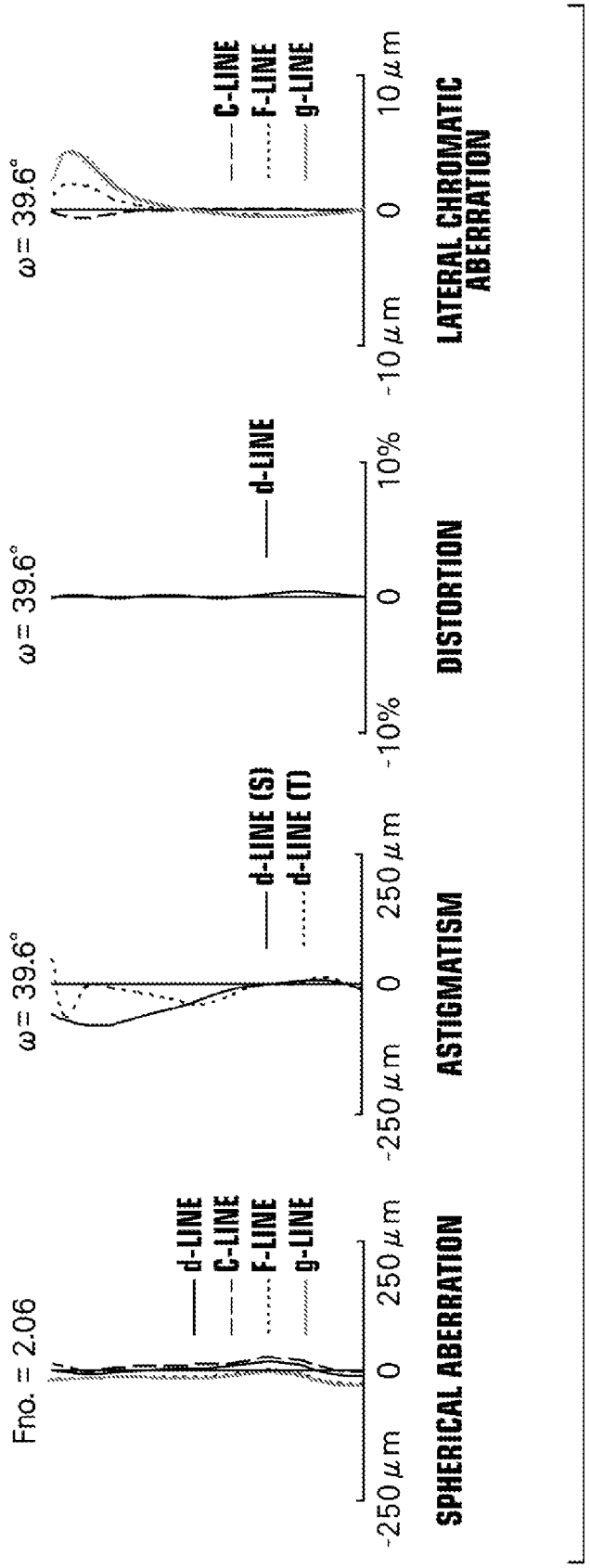
FIG. 19 shows aberration diagrams of the imaging lens of Example 7, in which diagrams of spherical aberration, astigmatism, distortion, and lateral chromatic aberration are arranged from the left in the drawing.
Figure 20:
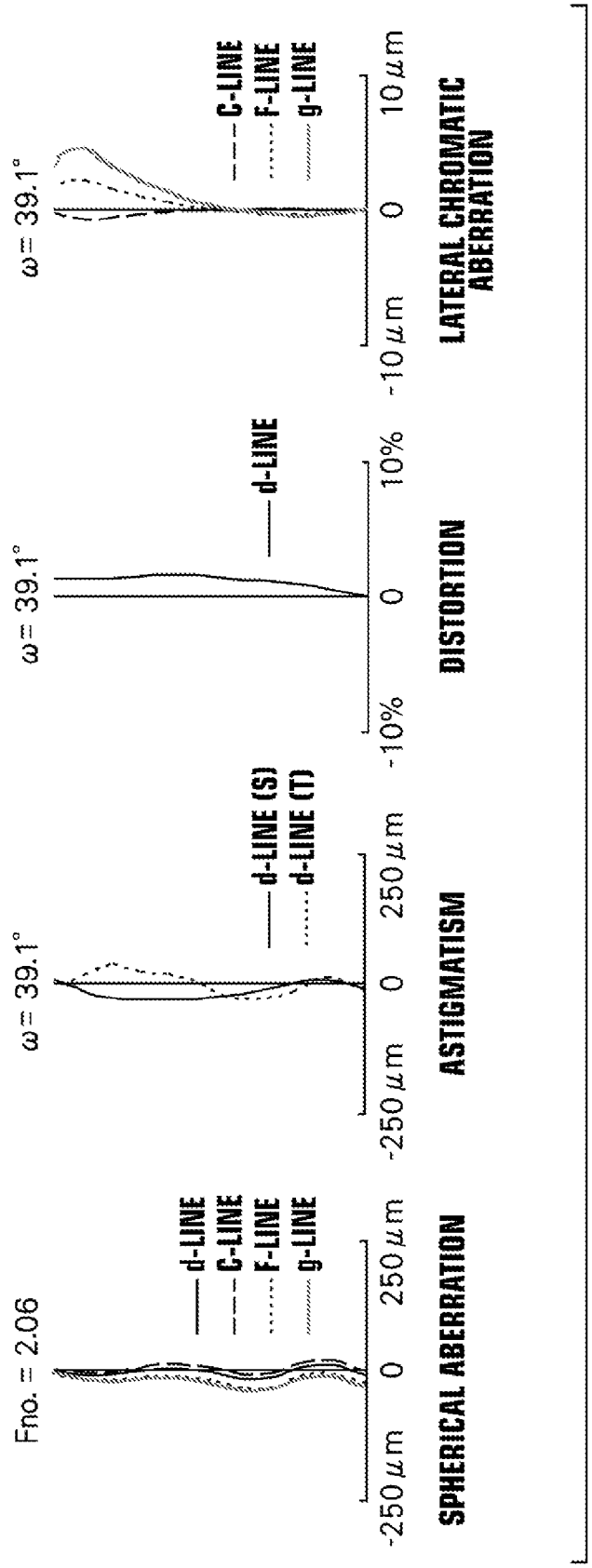
FIG. 20 shows aberration diagrams of the imaging lens of Example 8, in which diagrams of spherical aberration, astigmatism, distortion, and lateral chromatic aberration are arranged from the left in the drawing.
Figure 21:
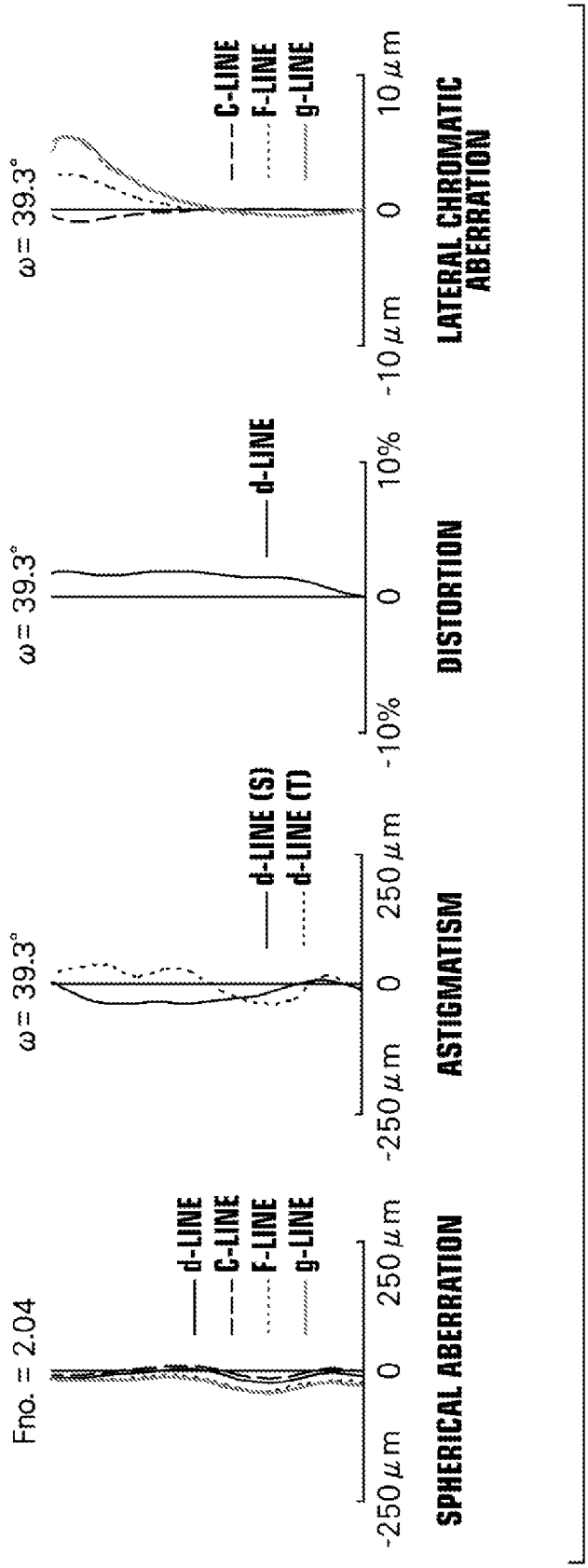
FIG. 21 shows aberration diagrams of the imaging lens of Example 9, in which diagrams of spherical aberration, astigmatism, distortion, and lateral chromatic aberration are arranged from the left in the drawing.
Figure 22:
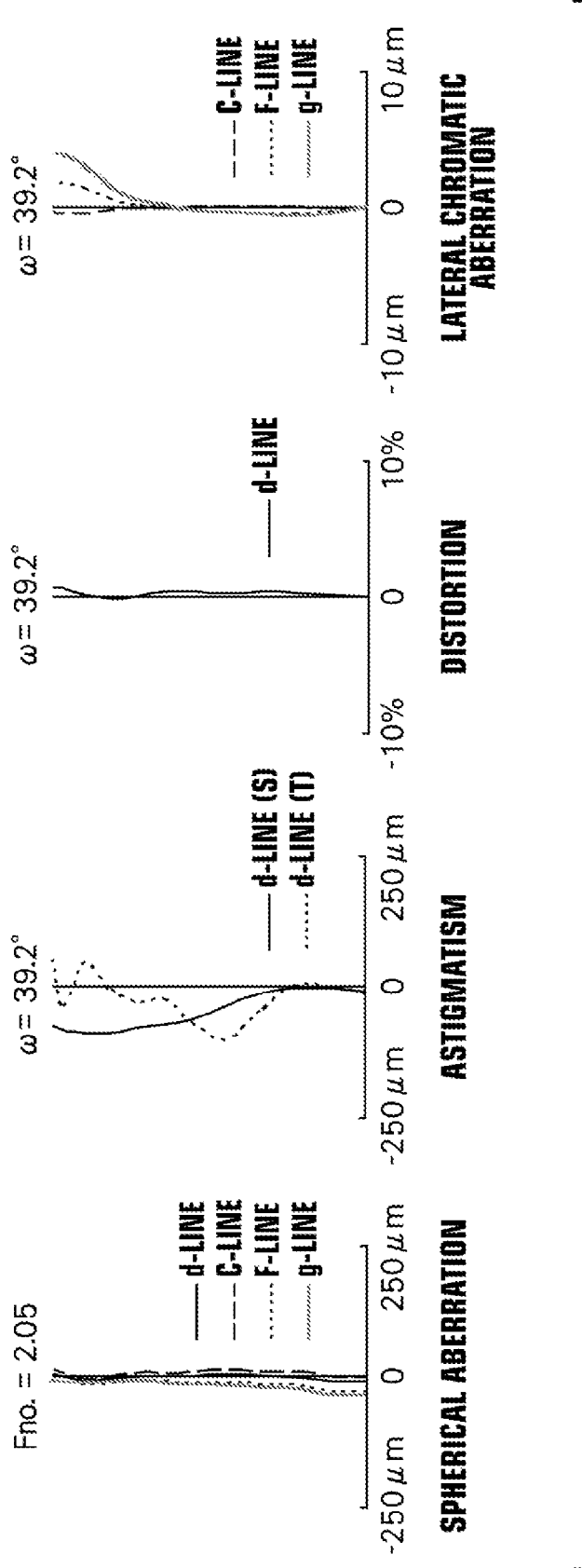
FIG. 22 shows aberration diagrams of the imaging lens of Example 10, in which diagrams of spherical aberration, astigmatism, distortion, and lateral chromatic aberration are arranged from the left in the drawing.
Figure 23:
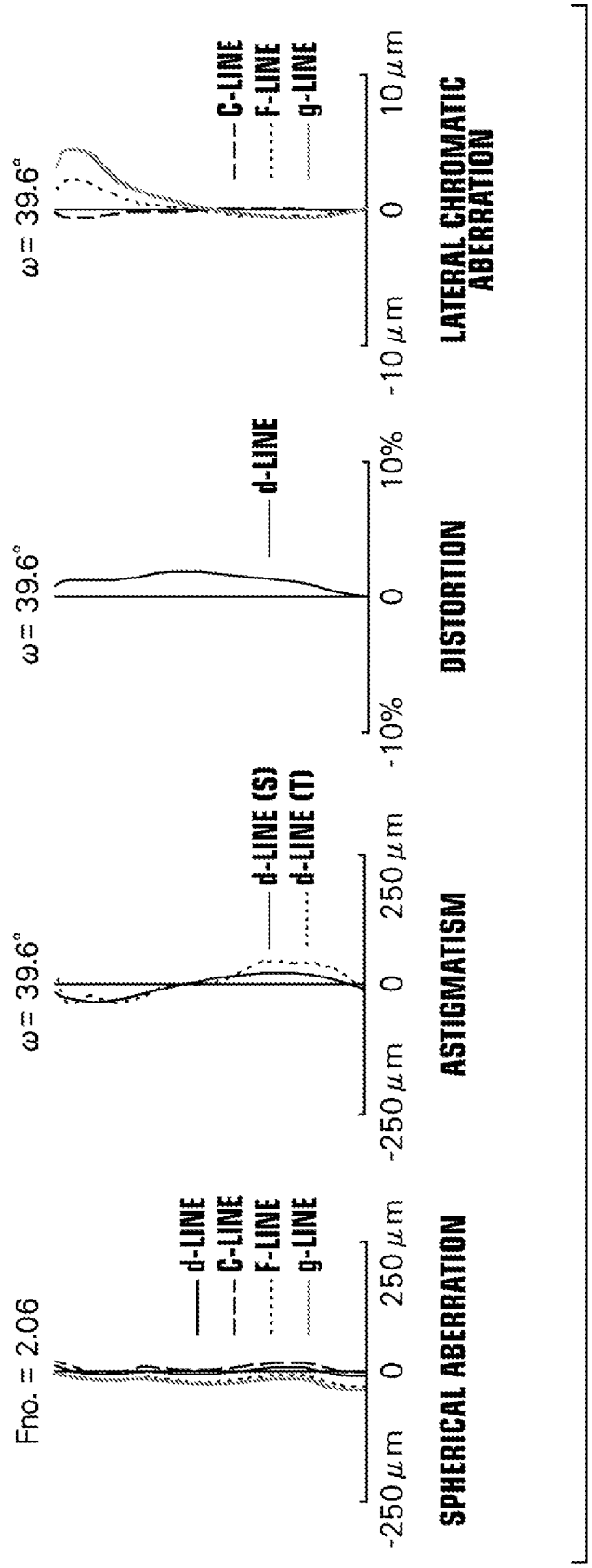
FIG. 23 shows aberration diagrams of the imaging lens of Example 11, in which diagrams of spherical aberration, astigmatism, distortion, and lateral chromatic aberration are arranged from the left in the drawing.

FIG. 13 shows, from the left, aberration diagrams of spherical aberration, astigmatism, distortion, lateral chromatic aberration of the imaging lens of Example 1. Each aberration diagram of spherical aberration, astigmatism, and distortion illustrates aberration with the d-line (wavelength 587.6 nm) as the reference wavelength, but the spherical aberration diagram also illustrates aberrations with respect to the F-line (wavelength 486.1 nm), the C-line (wavelength 656.3 nm), and the g-line (wavelength 435.8 nm), while the lateral chromatic aberration diagram illustrates aberrations with respect to the F-line, the C-line, and the g-line. In the astigmatism diagram, the solid line illustrates aberration in the sagittal direction (S) and the broken line illustrates aberration in the tangential direction (T). The Fno represents the F-number and ω represents the maximum half angle of view when an object at infinity is in focus.

Likewise, various types of aberrations of the imaging lenses of Examples 2 to 11 are illustrated in FIGS. 14 to 23. The aberration diagrams shown in FIGS. 13 to 23 are all in the case in which the object distance is infinity.

Table 23 summarizes values corresponding to the respective conditional expressions (1) to (5) described above and the value of entrance pupil diameter φ for each of Examples 1 to 11.

Each Table indicates values rounded to a predetermined digit. As for the unit of each numerical value, "°" is used for angle, and "mm" is used for length. But, these are only examples and other appropriate units may also be used, as optical systems can be used by proportionally enlarged or reduced.

As is known from each numerical data and each aberration diagram, each of the imaging lenses of Example 1 to 11 has an increased angle of view with a maximum angle of view of 75° or more when an object at infinity is in focus and a small F-number, and realizes high imaging performance from the central to peripheral angles of view with various types of aberrations being corrected satisfactorily, while the overall lens length is reduced with respect to image size and focal length.

So far, the present invention has been described by way of embodiments and Examples, but it should be understood that the imaging lens of the present invention is not limited to the embodiments and Examples described above, and various changes and modifications may be made. For example, values of radius of curvature, surface distance, refractive index, Abbe number, and aspherical surface coefficient of each lens are not limited to those shown in each numerical example and may take other values.

Each of all Examples is described on the assumption that the imaging lens is used in fixed focus, but it is possible to take a configuration that allows focus adjustment. For example, it is possible to take a configuration that allows auto-focusing by, for example, paying out the entire lens system or moving some of the lenses on the optical axis.

TABLE 1

Example 1
f = 3.675, Bf = 0.990, Fno. = 1.97, 2ω = 76.8

| Si | Ri | Di | Ndj | vdj |
|---|---|---|---|---|
| 1(St) | ∞ | −0.240 | | |
| *2 | 1.41681 | 0.635 | 1.54488 | 54.87 |
| *3 | −11.47268 | 0.092 | | |
| *4 | −1.93472 | 0.250 | 1.63350 | 23.62 |
| *5 | −5.04970 | 0.329 | | |
| *6 | 11.23599 | 0.256 | 1.63350 | 23.62 |
| *7 | 8.62391 | 0.375 | | |
| *8 | −1.94929 | 0.526 | 1.54488 | 54.87 |
| *9 | −1.06514 | 0.440 | | |
| *10 | 7.60547 | 0.360 | 1.54488 | 54.87 |
| *11 | 1.26695 | 0.408 | | |
| 12 | ∞ | 0.210 | 1.51633 | 64.14 |
| 13 | ∞ | 0.444 | | |
| 14(IMG) | ∞ | | | |

TABLE 2

Example 1

| Si | 2 | 3 | 4 | 5 | 6 |
|---|---|---|---|---|---|
| KA | 1.2894431E−01 | 8.4749965E+00 | −2.5055816E+00 | 1.0000009E+01 | 9.7521520E−01 |
| A3 | 0.0000000E+00 | 0.0000000E+00 | 0.0000000E+00 | 0.0000000E+00 | 0.0000000E+00 |
| A4 | 1.2429721E−02 | 1.4583356E+00 | 3.5096341E−01 | 3.0597926E−01 | 7.2145780E−02 |
| A5 | −5.3180321E−01 | −2.6516591E+01 | 7.2375378E−01 | 7.5071172E−01 | −4.6739413E−01 |
| A6 | 5.3608206E+00 | 2.0418122E+02 | −1.8117673E+00 | −3.2360632E+00 | −3.7924610E+00 |
| A7 | −2.1678140E+01 | −8.3096699E+02 | −9.4826795E+00 | 5.3417120E+00 | 2.6083504E+01 |
| A8 | 4.5123982E+01 | 1.9033743E+03 | 4.2881728E+01 | −3.4129099E+00 | −7.1024784E+01 |
| A9 | −4.4918620E+01 | −2.2383360E+03 | −5.1420909E+01 | −9.1553054E+00 | 9.1586424E+01 |
| A10 | 8.8050490E+00 | 4.2447823E+02 | −2.5723307E+01 | 3.4017893E+01 | −5.1006860E+01 |
| A11 | 1.1242997E+01 | 2.1331416E+03 | 8.8296729E+01 | −4.8791820E+01 | 6.8931737E+01 |
| A12 | 7.1012577E+00 | −2.0286833E+03 | 1.2821005E−01 | 3.2584399E+01 | −2.8375369E+02 |
| A13 | −2.3198975E+00 | −5.9766259E+02 | −9.0661392E+01 | −1.2284536E+01 | 5.2051801E+02 |
| A14 | −3.0771705E+01 | 2.0648539E+03 | 2.2215523E+01 | 1.5979090E+01 | −4.8043480E+02 |
| A15 | 3.1808884E+01 | −1.2825339E+03 | 5.0453895E+01 | −1.9249611E+01 | 2.2848196E+02 |
| A16 | −9.2637817E+00 | 2.7316790E+02 | −2.5750911E+01 | 7.3784642E+00 | −4.5572793E+01 |

| Si | 7 | 8 | 9 | 10 | 11 |
|---|---|---|---|---|---|
| KA | 1.0000009E+01 | 1.1916314E+00 | −2.4803472E−01 | 5.5770328E+00 | −3.1275741E−01 |
| A3 | 0.0000000E+00 | 0.0000000E+00 | 0.0000000E+00 | 0.0000000E+00 | 0.0000000E+00 |
| A4 | 9.5980273E−02 | −1.6633238E+00 | 2.6755652E−01 | −2.5203159E−01 | −5.7059189E−01 |
| A5 | −9.5039335E−01 | 2.6107246E+01 | −1.4106850E+00 | 1.1408962E−01 | 3.7665796E−01 |
| A6 | 2.1597449E+00 | −1.6371643E+02 | 6.0245465E+00 | −1.8570955E−01 | 3.9887646E−01 |
| A7 | −4.0699733E+00 | 5.3978047E+02 | −1.4755054E+01 | 6.7226661E−01 | −8.4945760E−01 |
| A8 | 1.8759975E+01 | −9.4888977E+02 | 1.9289311E+01 | −9.3926217E−01 | 5.9121765E−01 |
| A9 | −7.3219560E+01 | 6.5434208E+02 | −1.2210429E+01 | 5.9883482E−01 | −1.0332806E−01 |
| A10 | 1.4146680E+02 | 4.9216968E+02 | 3.8383846E+00 | −1.6683334E−01 | −1.1345221E−01 |
| A11 | −1.2173839E+02 | −9.9948396E+02 | −5.0000422E+00 | 4.4250340E−02 | 7.0823929E−02 |
| A12 | 1.1125021E+01 | −2.6021425E+02 | 6.6613741E+00 | −6.8895801E−02 | −2.9364550E−04 |
| A13 | 4.2153315E+01 | 1.7976758E+03 | −2.1909797E+00 | 6.2861001E−02 | −1.3346152E−02 |
| A14 | 1.3092013E+00 | −1.7817193E+03 | −1.2421215E+00 | −2.9393405E−02 | 5.1493192E−03 |
| A15 | −2.8375519E+01 | 7.7847671E+02 | 9.1050824E−01 | 7.2296738E−03 | −7.4002343E−04 |
| A16 | 1.1174850E+01 | −1.3284871E+02 | −1.4449981E−01 | −7.4203290E−04 | 2.8533669E−05 |

TABLE 3

Example 2
f = 3.733, Bf = 1.005, Fno. = 1.95, 2ω = 75.2

| Si | Ri | Di | Ndj | νdj |
|---|---|---|---|---|
| 1(St) | ∞ | −0.240 | | |
| *2 | 1.41353 | 0.632 | 1.54488 | 54.87 |
| *3 | −11.40933 | 0.097 | | |
| *4 | −1.93387 | 0.250 | 1.63350 | 23.62 |
| *5 | −5.05338 | 0.328 | | |
| *6 | 11.34348 | 0.263 | 1.63350 | 23.62 |
| *7 | 8.61779 | 0.386 | | |
| *8 | −1.92616 | 0.502 | 1.54488 | 54.87 |
| *9 | −1.07069 | 0.431 | | |
| *10 | 7.92217 | 0.360 | 1.54488 | 54.87 |
| *11 | 1.26713 | 0.408 | | |
| 12 | ∞ | 0.210 | 1.51633 | 64.14 |
| 13 | ∞ | 0.459 | | |
| 14(IMG) | ∞ | | | |

TABLE 4

Example 2

| Si | 2 | 3 | 4 | 5 | 6 |
|---|---|---|---|---|---|
| KA | 1.2892883E−01 | 6.6447224E+00 | −2.5033952E+00 | 1.0000007E+01 | 4.8278526E+00 |
| A3 | 0.0000000E+00 | 0.0000000E+00 | 0.0000000E+00 | 0.0000000E+00 | 0.0000000E+00 |
| A4 | −5.3311195E−02 | 5.1173052E−01 | 3.5649595E−01 | 3.2838932E−01 | 7.0224444E−02 |
| A5 | 5.6624473E−01 | −7.9752627E+00 | 3.9291642E−01 | 7.0484774E−01 | −1.2916657E+00 |
| A6 | −2.5071866E+00 | 5.3295148E+01 | 7.2420888E−01 | −3.1911573E+00 | 4.3459540E+00 |
| A7 | 9.8668543E+00 | −1.7114481E+02 | −1.6792248E+01 | 5.3208112E+00 | −1.3271412E+01 |
| A8 | −2.8799029E+01 | 2.5171517E+02 | 4.9255642E+01 | −5.4526376E+00 | 4.0980477E+01 |
| A9 | 4.7723814E+01 | −7.0220190E+00 | −3.6005053E+01 | 3.6839704E+00 | −9.6010817E+01 |
| A10 | −2.1507844E+01 | −5.8715639E+02 | −6.1233767E+01 | −7.5214966E−01 | 1.1030753E+02 |
| A11 | −5.3384420E+01 | 1.1306098E+03 | 5.1839304E+01 | 8.5202250E−01 | 1.6420453E+01 |
| A12 | 6.7643836E+01 | −1.5176367E+03 | 2.3031691E+02 | −3.6337246E−01 | −1.7247297E+02 |
| A13 | 3.1286664E+01 | 1.8662661E+03 | −4.6907059E+02 | −1.7308083E+01 | 1.2000136E+02 |
| A14 | −1.0679528E+02 | −1.7275015E+03 | 3.3941717E+02 | 4.1228846E+01 | 6.0111879E+01 |
| A15 | 7.2200833E+01 | 9.2088852E+02 | −8.8846601E+01 | −3.6036028E+01 | −1.0296197E+02 |
| A16 | −1.6267877E+01 | −2.0488939E+02 | −1.4296505E−01 | 1.1215417E+01 | 3.3397832E+01 |

| Si | 7 | 8 | 9 | 10 | 11 |
|---|---|---|---|---|---|
| KA | 9.7505685E+00 | 1.1919473E+00 | −2.5014949E−01 | 5.4387985E+00 | −3.1137825E−01 |
| A3 | 0.0000000E+00 | 0.0000000E+00 | 0.0000000E+00 | 0.0000000E+00 | 0.0000000E+00 |
| A4 | 8.0808474E−02 | −4.0945947E−01 | 1.8174778E−01 | −2.4923800E−01 | −5.9324572E−01 |
| A5 | −1.2157078E+00 | 6.0787615E+00 | −2.3167640E−01 | 3.1144088E−02 | 4.8090936E−01 |
| A6 | 4.1256298E+00 | −3.1973532E+01 | −4.7107059E−01 | 1.2617370E−01 | 6.0599769E−02 |
| A7 | −9.5411968E+00 | 8.9196622E+01 | 5.6916425E+00 | 6.7286034E−02 | −2.9369148E−01 |
| A8 | 2.2779059E+01 | −1.2478724E+02 | −1.9247730E+01 | −2.4307720E−01 | 1.6542900E−01 |
| A9 | −5.3616225E+01 | 2.3351449E+01 | 3.1466860E+01 | 1.4052530E−01 | −7.4140428E−02 |
| A10 | 7.1768601E+01 | 1.9663739E+02 | −2.5816661E+01 | −1.8155354E−02 | 1.0030541E−01 |
| A11 | −2.1109565E+01 | −2.9384700E+02 | 1.0901298E+01 | 4.5744795E−03 | −9.3323946E−02 |
| A12 | −4.7003498E+01 | 1.4601335E+02 | −9.9862238E+00 | −2.3026224E−03 | 3.3834470E−02 |
| A13 | 2.0162077E+01 | 3.4000090E+01 | 1.7484629E+01 | −5.2752358E−03 | 4.7517588E−03 |
| A14 | 5.4566301E+01 | −6.3442271E+01 | −1.4786229E+01 | 3.3295794E−03 | −7.9996271E−03 |
| A15 | −5.8133333E+01 | 2.0345470E+01 | 5.6931259E+00 | −5.0248986E−04 | 2.4765137E−03 |
| A16 | 1.7023659E+01 | −1.1410291E+00 | −8.3010325E−01 | −7.2624570E−06 | −2.6392700E−04 |

TABLE 5

Example 3
f = 3.731, Bf = 1.014, Fno. = 2.06, 2ω = 78.6

| Si | Ri | Di | Ndj | νdj |
|---|---|---|---|---|
| 1(St) | ∞ | 0.000 | | |
| *2 | 1.53096 | 0.651 | 1.54488 | 54.87 |
| *3 | −5.22731 | 0.071 | | |
| *4 | −2.19740 | 0.256 | 1.63350 | 23.62 |
| *5 | −12.27510 | 0.353 | | |
| *6 | 9.10318 | 0.262 | 1.63350 | 23.62 |
| *7 | 8.27957 | 0.347 | | |
| *8 | −1.73230 | 0.460 | 1.54488 | 54.87 |

TABLE 5-continued

Example 3
f = 3.731, Bf = 1.014, Fno. = 2.06, 2ω = 78.6

| Si | Ri | Di | Ndj | νdj |
|---|---|---|---|---|
| *9 | −0.99956 | 0.464 | | |
| *10 | 6.93246 | 0.395 | 1.54488 | 54.87 |
| *11 | 1.15865 | 0.408 | | |
| 12 | ∞ | 0.210 | 1.51633 | 64.14 |
| 13 | ∞ | 0.468 | | |
| 14(IMG) | ∞ | | | |

TABLE 6

| | Example 3 | | | | |
|---|---|---|---|---|---|
| Si | 2 | 3 | 4 | 5 | 6 |
| KA | −5.0788707E−02 | 7.9309354E+00 | −4.3128026E−01 | −1.1125109E+01 | 8.7344056E−06 |
| A3 | 0.0000000E+00 | 0.0000000E+00 | 0.0000000E+00 | 0.0000000E+00 | 0.0000000E+00 |
| A4 | 9.0010066E−02 | −3.1303637E−01 | 4.5960584E−01 | 4.1616935E−01 | −8.9149643E−02 |
| A5 | −6.9689933E−01 | 8.2235820E+00 | 1.1616789E+00 | −1.3225804E+00 | 3.3975290E−01 |
| A6 | 8.4633549E−01 | −5.9838358E+01 | −9.5776769E+00 | 1.0233695E+01 | −1.6736064E+00 |
| A7 | 7.7858140E+00 | 2.5717580E+02 | 2.8163444E+01 | −5.0397218E+01 | 1.2749764E+00 |
| A8 | −3.7096647E+01 | −8.0028713E+02 | −4.7974512E+01 | 1.2566967E+02 | 4.9163342E−01 |
| A9 | 7.8297207E+01 | 2.1191340E+03 | 4.3620329E+01 | −1.4201739E+02 | 5.9978579E+00 |
| A10 | −8.4502226E+01 | −5.1052570E+03 | −1.3264352E+00 | −1.3326605E+01 | −1.9160507E+01 |
| A11 | 3.6742860E+00 | 1.0325698E+04 | −3.5622641E+01 | 2.0792478E+02 | 1.0607702E+01 |
| A12 | 1.3584212E+02 | −1.5642030E+04 | −5.6028611E+00 | −1.4807460E+02 | 1.9029149E+01 |
| A13 | −2.0805247E+02 | 1.6382264E+04 | 9.8185540E+01 | −1.3210539E+02 | −1.6228070E+01 |
| A14 | 1.4819116E+02 | −1.1065852E+04 | −1.2360767E+02 | 2.7779634E+02 | −2.3448050E+01 |
| A15 | −5.0125477E+01 | 4.3217589E−03 | 6.5446868E+01 | −1.7608822E+02 | 3.6086446E+01 |
| A16 | 5.7055415E+00 | −7.4071119E+02 | −1.3180861E+01 | 4.1347783E+01 | −1.3540500E+01 |

| Si | 7 | 8 | 9 | 10 | 11 |
|---|---|---|---|---|---|
| KA | −1.0000052E+00 | 1.3712389E−02 | 3.5225433E−02 | 8.2241273E+00 | −5.8632348E−01 |
| A3 | 0.0000000E+00 | 0.0000000E−00 | 0.0000000E+00 | 0.0000000E+00 | 0.0000000E+00 |
| A4 | −4.5144480E−02 | −3.6586789E−02 | 3.9825520E−01 | −2.6625309E−01 | −6.2940711E−01 |
| A5 | −7.3360120E−01 | 2.5248106E+00 | −1.9774136E+00 | 9.7594921E−02 | 4.9915115E−01 |
| A6 | 4.8449631E+00 | −1.2445641E+01 | 8.5997997E+00 | 4.0101726E−02 | 2.4880253E−01 |
| A7 | −1.4756211E+01 | 2.5186940E+01 | −2.2123905E+01 | 2.1420288E−01 | −6.6379580E−01 |
| A8 | 2.5752169E+01 | −9.0554479E+00 | 3.2723968E+01 | −4.8157145E−01 | 4.9252732E−01 |
| A9 | −2.9529611E+01 | −5.4792339E+01 | −2.5310472E+01 | 3.7781635E−01 | −1.7189626E−01 |
| A10 | 1.1097862E+01 | 1.0903461E+02 | 5.0710254E+00 | −1.5117639E−01 | 9.1331654E−03 |
| A11 | 3.7030566E+01 | −1.0534608E+02 | 4.8894446E+00 | 4.7628399E−02 | 5.8559227E−03 |
| A12 | −6.3434134E+01 | 1.0851226E+02 | 3.8671762E−01 | −1.5703246E−02 | 1.3379327E−02 |
| A13 | 1.5041126E+01 | −1.5298551E+02 | −5.1608783EE+00 | 1.0454997E−03 | −1.3966806E−02 |
| A14 | 4.6083108E+01 | 1.5019676E+02 | 3.3272213E+00 | 1.6189018E−03 | 5.5562687E−03 |
| A15 | −4.3123698E+01 | −7.6032128E+01 | −7.4428457E−01 | −4.6629366E−04 | −1.0323725E−03 |
| A16 | 1.1663587E+01 | 1.5273272E+01 | 3.2176356E−02 | 3.0004912E−05 | 7.3322983E−05 |

TABLE 7

Example 4
f = 3.679, Bf = 1.153, Fno. = 2.12, 2ω = 76.6

| Si | Ri | Di | Ndj | νdj |
|---|---|---|---|---|
| 1(St) | ∞ | −0.200 | | |
| *2 | 1.57014 | 0.583 | 1.54488 | 54.87 |
| *3 | −12.84072 | 0.093 | | |
| *4 | −2.55409 | 0.250 | 1.63894 | 22.97 |
| *5 | −12.09109 | 0.142 | | |
| *6 | 2.29218 | 0.259 | 1.63894 | 22.97 |
| *7 | 2.11560 | 0.493 | | |
| *8 | −3.72045 | 0.574 | 1.54488 | 54.87 |

TABLE 7-continued

Example 4
f = 3.679, Bf = 1.153, Fno. = 2.12, 2ω = 76.6

| Si | Ri | Di | Ndj | νdj |
|---|---|---|---|---|
| *9 | −1.24425 | 0.449 | | |
| *10 | 4.67751 | 0.250 | 1.54488 | 54.87 |
| *11 | 1.16961 | 0.408 | | |
| 12 | ∞ | 0.214 | 1.56700 | 37.80 |
| 13 | ∞ | 0.608 | | |
| 14(IMG) | ∞ | | | |

TABLE 8

Example 4

| Si | 2 | 3 | 4 | 5 | 6 |
|---|---|---|---|---|---|
| KA | −2.6319278E+00 | −3.1674581E+01 | −2.7939377E+01 | 0.0000000E+00 | −4.0000000E+00 |
| A3 | 0.0000000E+00 | 0.0000000E+00 | 0.0000000E+00 | 0.0000000E+00 | 0.0000000E+00 |
| A4 | 3.3694258E−01 | −1.7334077E−01 | 1.4371850E−01 | 1.2743320E−02 | −2.3998677E−01 |
| A5 | −2.0577511E+00 | 4.3689302E+00 | 1.0676579E−01 | 1.0168078E+00 | −2.1537050E−02 |
| A6 | 7.0507902E+00 | −3.1391425E+01 | −7.6652752E−01 | −2.4230067E+00 | 9.8172827E−02 |
| A7 | −1.3918987E+01 | 1.2103174E+02 | 2.2548610E+00 | −1.7877873E+00 | 1.3308178E−01 |
| A8 | 1.9354924E+01 | −2.7061260E+02 | −2.3425552E+00 | 1.7387356E+01 | −7.8596574E−01 |
| A9 | −8.4955474E+00 | 3.3238482E+02 | −8.9511051E+00 | −3.5966557E+01 | 5.9966857E−01 |
| A10 | −6.8067479E+01 | −2.0142956E+02 | 2.3320179E+01 | 4.6405701E+01 | 8.5863982E−01 |
| A11 | 2.2035393E+02 | 2.5755600E+02 | 2.7103177E+00 | −5.6981295E+01 | 6.6704973E−02 |
| A12 | −3.0513463E+02 | −9.9260266E+02 | −4.6785081E+01 | 6.7596285E+01 | −1.5455542E+00 |
| A13 | 1.9337559E+02 | 1.8762662E+03 | 4.3532123E+00 | −5.2442509E+01 | −4.0966844E−01 |
| A14 | −1.5794536E+01 | −1.8060739E+03 | 8.9132577E+01 | 1.5828313E+01 | 1.7358936E+00 |
| A15 | −4.2717224E+01 | 8.9114427E+02 | −9.1423241E+01 | 3.8447521E+00 | −7.6552455E−01 |
| A16 | 1.5727535E+01 | −1.8055395E+02 | 2.8256714E+01 | −2.5045468E+00 | 5.4648365E−02 |

| Si | 7 | 8 | 9 | 10 | 11 |
|---|---|---|---|---|---|
| KA | 0.0000000E+00 | −3.4508409E−02 | 2.5242414E−01 | −9.8000000E+01 | 6.1651013E−02 |
| A3 | 0.0000000E+00 | 0.0000000E+00 | 0.0000000E+00 | 0.0000000E+00 | 0.0000000E+00 |
| A4 | −1.1659464E−01 | −3.6339731E−01 | 7.3159072E−01 | −1.7787800E−01 | −7.3878248E−01 |
| A5 | −1.4204389E−01 | 7.4375416E+00 | −5.9380391E+00 | 2.3819691E−02 | 8.7204429E−01 |
| A6 | 5.1152534E−01 | −5.1229989E+01 | 2.9164760E+01 | 1.1845099E−02 | −8.0969055E−01 |
| A7 | −2.1014611E+00 | 1.9933271E+02 | −7.6054506E+01 | 7.4806226E−02 | 9.8101970E−01 |
| A8 | 4.5682229E+00 | −4.9271311E+02 | 1.0026255E+02 | −1.2329567E−01 | −1.0944352E+00 |
| A9 | −3.5428311E+00 | 8.0863087E+02 | −2.9535786E+01 | 9.1550073E−02 | 8.0888437E−01 |
| A10 | −1.2645128E+00 | −8.5587162E+02 | −1.0222844E+02 | −1.9526192E−02 | −3.4841930E−01 |
| A11 | 9.8650328E−01 | 4.4183851E+02 | 1.5219150E+02 | −2.2860995E−02 | 4.9861034E−02 |
| A12 | 6.9364549E+00 | 2.1783056E+02 | −7.5991927E+01 | 2.1969947E−02 | 3.7816595E−02 |
| A13 | −8.9302211E+00 | −6.1270372E+02 | −1.2823181E+01 | −8.7689160E−03 | −2.9292149E−02 |
| A14 | 9.6878240E−01 | 5.1325713E+02 | 3.2358028E+01 | 1.7579858E−03 | 9.9857011E−03 |
| A15 | 3.5407993E+00 | −2.1102013E+02 | −1.4151599E+01 | −1.2344443E−04 | −1.7847647E−03 |
| A16 | −1.4900839E+00 | 3.5607372E+01 | 2.1492798E+00 | −7.4582198E−06 | 1.3181772E−04 |

TABLE 9

Example 5
f = 3.678, Bf = 1.022, Fno. = 2.06, 2ω = 79.0

| Si | Ri | Di | Ndj | νdj |
|---|---|---|---|---|
| 1(St) | ∞ | −0.240 | | |
| *2 | 1.45606 | 0.591 | 1.54488 | 54.87 |
| *3 | −15.98841 | 0.098 | | |
| *4 | −3.01889 | 0.257 | 1.63350 | 23.62 |
| *5 | 38.73351 | 0.167 | | |
| *6 | 2.77785 | 0.260 | 1.63350 | 23.62 |
| *7 | 2.56404 | 0.493 | | |
| *8 | −3.74373 | 0.697 | 1.54488 | 54.87 |
| *9 | −1.08733 | 0.423 | | |
| *10 | −40.01510 | 0.270 | 1.54488 | 54.87 |
| *11 | 1.29558 | 0.408 | | |
| 12 | ∞ | 0.210 | 1.51633 | 64.14 |
| 13 | ∞ | 0.476 | | |
| 14(IMG) | ∞ | | | |

TABLE 10

Example 5

| Si | 2 | 3 | 4 | 5 | 6 |
|---|---|---|---|---|---|
| KA | −1.4180508E+00 | 9.9746451E+00 | −2.7920396E+01 | −1.0000009E+01 | −8.5877685E+00 |
| A3 | 0.0000000E+00 | 0.0000000E+00 | 0.0000000E+00 | 0.0000000E+00 | 0.0000000E+00 |
| A4 | −7.5211705E−02 | −6.3813358E−02 | 4.4415634E−01 | 8.0166023E−02 | −1.5910779E−01 |
| A5 | −2.1251679E+00 | 2.1328971E+00 | −8.6568427E−01 | 1.8268982E+00 | 2.2253446E−01 |
| A6 | 2.7391583E+01 | −1.2702976E+01 | 5.6079672E+00 | −5.1022353E+00 | 5.3750790E+00 |
| A7 | −1.1791393E+02 | 4.3203448E+01 | −3.0291536E+01 | 6.3470562E+00 | −4.2013798E+01 |
| A8 | 2.3220007E+02 | −8.8735905E+01 | 8.7462764E+01 | −2.3979050E+01 | 9.5081562E+01 |
| A9 | −1.1741309E+02 | 8.9709502E+01 | −1.2710565E+02 | 1.0976233E+02 | 1.8436631E+01 |
| A10 | −3.7979220E+02 | 1.9607990E+01 | 4.1670149E+01 | −2.4107925E+02 | −3.9800054E+02 |
| A11 | 7.5133849E+02 | −1.6030843E+02 | 1.3909071E+02 | 2.5846838E+02 | 5.3714506E+02 |
| A12 | −3.1423250E+02 | 1.5369653E+02 | −1.7014603E+02 | −9.6940944E+01 | −2.2629747E+01 |
| A13 | −5.6344810E+02 | −1.4861905E+01 | −3.7307421E+01 | −6.3317920E+01 | −3.5838589E+02 |
| A14 | 8.6182555E+02 | −6.4780425E+01 | 2.0550799E+02 | 7.9310735E+01 | −1.2265521E+01 |
| A15 | −4.7820162E+02 | 4.0184962E+01 | −1.5143285E+02 | −2.7346197E+01 | 3.3076677E+02 |
| A16 | 1.0043719E+02 | −7.1332486E+00 | 3.7554984E+01 | 2.1147491E+00 | −1.5422688E+02 |

| Si | 7 | 8 | 9 | 10 | 11 |
|---|---|---|---|---|---|
| KA | 2.4379309E+00 | −2.3885361E+00 | 3.1928697E−01 | −9.9975061E+00 | −2.2141826E−01 |
| A3 | 0.0000000E+00 | 0.0000000E+00 | 0.0000000E+00 | 0.0000000E+00 | 0.0000000E+00 |
| A4 | −4.0634011E−01 | −3.7693029E−01 | 3.6564096E−01 | −4.3401328E−01 | −8.0341903E−01 |
| A5 | 1.9185811E+00 | 5.0111924E+00 | −1.1564771E+00 | −7.7073874E−02 | 7.2569203E−01 |
| A6 | −6.9786860E+00 | −2.6803313E+01 | 3.6611389E+00 | 1.3905956E+00 | 1.5274662E−01 |
| A7 | 2.0135166E+01 | 7.0788160E+01 | −1.0577987E+01 | −1.8817012E+00 | −6.8706079E−01 |
| A8 | −5.0205393E+01 | −9.4549041E+01 | 2.1869735E+01 | 9.5350123E−01 | 5.9003604E−01 |
| A9 | 7.9883236E+01 | 4.8102803E+01 | −2.7625184E+01 | 5.5240464E−01 | −2.7944378E−01 |
| A10 | −4.2688602E+01 | 1.2634469E+01 | 1.7558467E+01 | −1.5610039E+00 | −6.6530230E−04 |
| A11 | −5.6777262E+01 | 3.5325571E+00 | 1.5720321E−01 | 1.4435637E+00 | 1.1555031E−01 |
| A12 | 6.2130116E+01 | −4.2947070E+01 | −8.0554163E+00 | −6.4497097E−01 | −6.8264715E−02 |
| A13 | 7.5269869E+01 | 1.5165252E+01 | 4.4331679E+00 | 7.6642080E−02 | 4.5537747E−03 |
| A14 | −1.6102566E+02 | 2.9603215E+01 | −4.5113060E−02 | 4.9164334E−02 | 9.3477641E−03 |
| A15 | 1.0089999E+02 | −2.6786288E+01 | −6.5174105E−01 | −2.0490734E−02 | −3.4793102E−03 |
| A16 | −2.2279552E+01 | 6.5850181E+00 | 1.5633364E−01 | 2.3762143E−03 | 3.8881891E−04 |

TABLE 11

Example 6
f = 3.772, Bf = 1.021, Fno. = 2.03, 2ω = 78.0

| Si | Ri | Di | Ndj | νdj |
|---|---|---|---|---|
| 1(St) | ∞ | −0.238 | | |
| *2 | 1.45450 | 0.642 | 1.54488 | 54.87 |
| *3 | −12.49846 | 0.095 | | |
| *4 | −3.11951 | 0.250 | 1.63350 | 23.62 |
| *5 | 41.65339 | 0.284 | | |
| *6 | 7.99942 | 0.260 | 1.63350 | 23.62 |
| *7 | 6.06024 | 0.380 | | |
| *8 | −2.57861 | 0.500 | 1.54488 | 54.87 |
| *9 | −1.13264 | 0.492 | | |
| *10 | 8.41801 | 0.352 | 1.54488 | 54.87 |
| *11 | 1.24080 | 0.408 | | |
| 12 | ∞ | 0.210 | 1.51633 | 64.14 |
| 13 | ∞ | 0.475 | | |
| 14(IMG) | ∞ | | | |

TABLE 12

Example 6

| Si | 2 | 3 | 4 | 5 | 6 |
|---|---|---|---|---|---|
| KA | 1.5348614E−01 | 8.5960755E+00 | −4.7119597E+00 | −9.9304242E+00 | −1.3038414E+00 |
| A3 | 0.0000000E+00 | 0.0000000E+00 | 0.0000000E+00 | 0.0000000E+00 | 0.0000000E+00 |
| A4 | −4.1892580E−02 | −1.1293543E−01 | 1.8537093E−01 | 4.3627023E−01 | 1.0155875E−01 |
| A5 | −1.8525464E−01 | 5.4122824E+00 | 2.4973176E+00 | −6.9143661E−01 | −4.4121674E−01 |
| A6 | 3.7845923E+00 | −5.4207333E+01 | −1.7383667E+01 | −3.3308292E+00 | −1.1318718E+01 |
| A7 | −1.4501722E+01 | 2.6925125E+02 | 5.7988091E+01 | 2.3340399E+01 | 6.4411729E+01 |
| A8 | 2.2959815E+01 | −7.3415761E+02 | −1.0482307E+02 | −5.0327961E+01 | −1.4445998E+02 |
| A9 | −9.7771271E+00 | 1.0241728E+03 | 6.7165995E+01 | 2.3344183E+01 | 1.0595088E+02 |
| A10 | −1.5997874E+01 | −2.8028156E+02 | 1.1257355E+02 | 6.5251498E+01 | 1.1366673E+02 |
| A11 | 3.1200760E+01 | −1.2600257E+03 | −2.5400847E+02 | −6.9191396E+01 | −1.7573657E+02 |
| A12 | −5.7515748E+01 | 1.7469520E+03 | 7.7542774E+01 | −5.6867612E+01 | −1.7565358E+02 |
| A13 | 1.0156856E+02 | −4.8072538E+02 | 3.0233977E+02 | 1.0386105E+02 | 4.9415763E+02 |
| A14 | −1.0297208E+02 | −7.3206233E+02 | −4.4218194E+02 | −1.0720797E+01 | −3.6750384E+02 |
| A15 | 5.1309127E+01 | 6.6475805E+02 | 2.5422736E+02 | −4.0925678E+01 | 1.0057252E+02 |
| A16 | −9.8531265E+00 | −1.6901623E+02 | −5.5962684E+01 | 1.5953515E+01 | −4.0180281E+00 |

| Si | 7 | 8 | 9 | 10 | 11 |
|---|---|---|---|---|---|
| KA | −4.9539924E+00 | 8.7958088E−01 | −2.1199844E−01 | 7.1049517E+00 | −6.2719469E−01 |
| A3 | 0.0000000E+00 | 0.0000000E+00 | 0.0000000E+00 | 0.0000000E+00 | 0.0000000E+00 |
| A4 | −1.0803608E−01 | −2.7538847E−01 | 3.2935413E−01 | −2.6431308E−01 | −6.0422665E−01 |
| A5 | 4.1082774E−03 | 4.9897815E+00 | −1.4893848E+00 | −6.1587545E−02 | 5.2258527E−01 |
| A6 | −1.8712883E−01 | −2.7936039E+01 | 6.0682145E+00 | 7.2737773E−01 | 9.5733222E−02 |
| A7 | −3.1524569E+00 | 8.5186473E+01 | −1.4406857E+01 | −1.1091902E+00 | −4.1500030E−01 |
| A8 | 1.6394269E+01 | −1.4536408E+02 | 1.8111769E+01 | 8.1566138E−01 | 2.4208227E−01 |
| A9 | −3.7478642E+01 | 1.1868778E+02 | −7.5242433E+00 | −1.8705608E−01 | −4.0432096E−02 |
| A10 | 4.8349965E+01 | 2.5595492E+01 | −8.1017119E+00 | −2.4685994E−01 | 7.0623626E−03 |
| A11 | −3.5538773E+01 | −1.6602255E+02 | 9.0191566E+00 | 3.0260004E−01 | −1.4979504E−02 |
| A12 | 5.6815615E+00 | 1.9969837E+02 | 2.5573138E+00 | −1.2631342E−01 | 2.1148947E−03 |
| A13 | 2.7435986E+01 | −1.6124044E+02 | −8.6755561E+00 | −1.3716303E−02 | 6.1449907E−03 |
| A14 | −4.3299232E+01 | 1.0429114E+02 | 5.6612639E+00 | 3.2531625E−02 | −3.8505390E−03 |
| A15 | 2.9601195E+01 | −4.5643376E+01 | −1.6473993E+00 | −1.1206604E−02 | 9.2272724E−04 |
| A16 | −7.8452417E+00 | 9.0420173E+00 | 1.8929550E−01 | 1.2953242E−03 | −8.2409020E−05 |

TABLE 13

Example 7
f = 3.717, Bf = 1.027, Fno. = 2.06, 2ω = 79.2

| Si | Ri | Di | Ndj | νdj |
|---|---|---|---|---|
| 1(St) | ∞ | −0.240 | | |
| *2 | 1.46432 | 0.583 | 1.54488 | 54.87 |
| *3 | −28.31170 | 0.095 | | |
| *4 | −2.62495 | 0.260 | 1.63350 | 23.62 |
| *5 | −11.56547 | 0.150 | | |
| *6 | 2.79571 | 0.271 | 1.63350 | 23.62 |
| *7 | 2.54829 | 0.481 | | |
| *8 | −3.38258 | 0.696 | 1.54488 | 54.87 |

TABLE 13-continued

Example 7
f = 3.717, Bf = 1.027, Fno. = 2.06, 2ω = 79.2

| Si | Ri | Di | Ndj | νdj |
|---|---|---|---|---|
| *9 | −1.09668 | 0.410 | | |
| *10 | −24.99118 | 0.301 | 1.54488 | 54.87 |
| *11 | 1.26146 | 0.408 | | |
| 12 | ∞ | 0.210 | 1.51633 | 64.14 |
| 13 | ∞ | 0.481 | | |
| 14(IMG) | ∞ | | | |

TABLE 14

Example 7

| Si | 2 | 3 | 4 | 5 | 6 |
|---|---|---|---|---|---|
| KA | −1.1450474E+00 | −1.0000009E+01 | −2.8949975E+01 | −1.0000009E+01 | −4.5458993E+00 |
| A3 | 0.0000000E+00 | 0.0000000E+00 | 0.0000000E+00 | 0.0000000E+00 | 0.0000000E+00 |
| A4 | 4.3699688E−02 | −2.4582782E−01 | 3.7051389E−01 | 4.0566377E−01 | −3.4865066E−01 |
| A5 | −3.0519001E−01 | 2.5696423E+00 | 1.4847031E−01 | 5.1068006E−01 | 2.4456921E+00 |
| A6 | 3.8328092E−01 | −9.3606126E+00 | −3.6594350E+00 | 1.6152479E+00 | −7.0798762E+00 |
| A7 | 1.2003337E+01 | 2.3192375E+01 | 8.5460179E+00 | −3.4859299E+01 | 8.8035943E+00 |
| A8 | −6.0450952E+01 | −5.3342229E+01 | 5.3648186E+00 | 1.2953182E+02 | −2.2188562E+01 |
| A9 | 1.2381028E+02 | 8.3682381E+01 | −5.4126819E+01 | −1.9223663E+02 | 8.7224461E+01 |
| A10 | −1.2819098E+02 | −9.3126414E+00 | 6.3674897E+01 | 3.6825385E+01 | −1.1946412E+02 |
| A11 | 9.8700385E+01 | −2.3825223E+02 | 6.3256346E+01 | 1.5653303E+02 | −9.3340844E+01 |
| A12 | −1.5118323E+02 | 4.4061712E+02 | −1.8913357E+02 | 1.6691828E+02 | 3.6408664E+02 |
| A13 | 2.2425116E+02 | −3.2993233E+02 | 8.9616452E+01 | −8.6766063E+02 | −1.3186882E+02 |
| A14 | −1.6869069E+02 | 6.1916047E+01 | 9.8940583E+01 | 1.0317774E+03 | −4.1182604E+02 |
| A15 | 5.2912412E+01 | 5.0472089E+01 | −1.1720759E+02 | −5.3026759E+02 | 4.8454963E+02 |
| A16 | −3.3124227E+00 | −2.2091086E+01 | 3.4369387E+01 | 1.0096706E+02 | −1.6144262E+02 |

| Si | 7 | 8 | 9 | 10 | 11 |
|---|---|---|---|---|---|
| KA | 2.3809505E+00 | 5.2084825E+00 | 3.2797264E−01 | 1.8284603E+00 | −2.2869598E−01 |
| A3 | 0.0000000E+00 | 0.0000000E+00 | 0.0000000E+00 | 0.0000000E+00 | 0.0000000E+00 |
| A4 | 5.1040449E−02 | −1.9686042E−01 | 2.6702753E−01 | −5.6418638E−01 | −9.1420308E−01 |
| A5 | −1.9317634E+00 | 4.5842220E+00 | −2.4631387E−01 | 4.0435225E−01 | 9.2083536E−01 |
| A6 | 1.4396948E+01 | −2.5569163E+01 | −1.1775160E+00 | −1.1250427E−01 | −2.5963673E−01 |
| A7 | −5.8704946E+01 | 6.4266475E+01 | 6.1480852E+00 | 1.0077766E+00 | 1.0005179E−01 |
| A8 | 1.3190821E+02 | −6.6738653E+01 | −1.5347199E+01 | −1.7380578E+00 | −1.8418142E−01 |
| A9 | −1.4256678E+02 | −2.5336519E+01 | 2.6257018E+01 | 9.3929921E−01 | −2.0904559E−02 |
| A10 | −1.2151871E+01 | 1.3400979E+02 | −3.2771647E+01 | 4.9950651E−02 | 1.6152523E−01 |
| A11 | 2.1740703E+02 | −1.2316529E+02 | 2.8411291E+01 | −1.5651947E−01 | −7.5332028E−02 |
| A12 | −2.1179655E+02 | 3.9307585E+01 | −1.4627246E+01 | −5.1424699E−02 | 4.0648679E−05 |
| A13 | 6.2875385E+00 | −1.7330775E+01 | 2.0943344E+00 | 8.8436600E−02 | 6.0855106E−04 |
| A14 | 1.2190788E+02 | 3.8186821E+01 | 2.1069186E+00 | −3.7121121E−02 | 5.2533341E−03 |
| A15 | −8.3165559E+01 | −2.9089851E+01 | −1.2109882E+00 | 7.4232516E−03 | −2.3257134E−03 |
| A16 | 1.8256344E+01 | 7.0850398E+00 | 1.9943720E−01 | −6.3631744E−04 | 2.9097904E−04 |

TABLE 15

Example 8
f = 3.678, Bf = 1.045, Fno. = 2.06, 2ω = 78.2

| Si | Ri | Di | Ndj | νdj |
|---|---|---|---|---|
| 1(St) | ∞ | −0.239 | | |
| *2 | 1.44888 | 0.597 | 1.54488 | 54.87 |
| *3 | 29.57086 | 0.112 | | |
| *4 | −3.76015 | 0.260 | 1.63350 | 23.62 |
| *5 | 45.45427 | 0.176 | | |
| *6 | 2.77780 | 0.266 | 1.63350 | 23.62 |
| *7 | 2.56410 | 0.464 | | |
| *8 | −3.98191 | 0.647 | 1.54488 | 54.87 |

TABLE 15-continued

Example 8
f = 3.678, Bf = 1.045, Fno. = 2.06, 2ω = 78.2

| Si | Ri | Di | Ndj | νdj |
|---|---|---|---|---|
| *9 | −1.09132 | 0.418 | | |
| *10 | −40.06518 | 0.295 | 1.54488 | 54.87 |
| *11 | 1.29980 | 0.408 | | |
| 12 | ∞ | 0.210 | 1.51633 | 64.14 |
| 13 | ∞ | 0.499 | | |
| 14(IMG) | ∞ | | | |

TABLE 16

Example 8

| Si | 2 | 3 | 4 | 5 | 6 |
|---|---|---|---|---|---|
| KA | −1.4186381E+00 | 7.7814197E+00 | −2.2961679E+01 | −1.0000009E+01 | −9.1870441E+00 |
| A3 | 0.0000000E+00 | 0.0000000E+00 | 0.0000000E+00 | 0.0000000E+00 | 0.0000000E+00 |
| A4 | −1.1542768E−01 | −8.3804672E−02 | 2.1676480E−01 | −2.0513542E−03 | −3.5722942E−01 |
| A5 | 5.9819710E−01 | 8.0031019E−01 | −3.1304256E−01 | 9.4272923E−01 | 5.9884177E−01 |
| A6 | 3.6763982E+00 | −4.4898977E+00 | −1.2485169E+00 | −5.4506807E+00 | 2.0739159E+00 |
| A7 | −2.6914244E+01 | 1.3232721E+01 | 5.9508958E+00 | 1.5568058E+01 | −2.6281162E+01 |
| A8 | 7.3756981E+01 | −1.0789563E+01 | 1.5405146E+01 | −1.7157618E+01 | 7.7279345E+01 |
| A9 | −1.2968907E+02 | −4.2221991E+01 | −1.2831855E+02 | 1.2041677E−01 | −7.4468267E+01 |
| A10 | 2.3391055E+02 | 1.2253015E+02 | 2.8357818E+02 | 1.6399033E+00 | −2.7172370E+01 |
| A11 | −4.4697086E+02 | −1.0350874E+02 | −2.3527020E+02 | 1.1965550E+01 | 5.0368313E+01 |
| A12 | 5.9304715E+02 | −1.5867957E+01 | −6.5381284E+01 | 2.6809985E+01 | 5.1458099E−01 |
| A13 | −3.9899282E+02 | 3.4398816E+01 | 2.4711287E+02 | −5.4856806E+01 | 2.5389940E+02 |
| A14 | 3.8348193E+01 | 6.1986356E+01 | −1.3582613E+02 | −3.1869257E+01 | −6.4610804E+02 |
| A15 | 9.8467349E+01 | −8.2055399E+01 | 2.9981205E+00 | 9.5458049E+01 | 5.5471966E+02 |
| A16 | −3.9118348E+01 | 2.5974066E+01 | 1.1201865E+01 | −4.3084881E+01 | −1.6536652E+02 |

| Si | 7 | 8 | 9 | 10 | 11 |
|---|---|---|---|---|---|
| KA | 2.6499535E+00 | −1.2451822E+00 | 3.2227653E−01 | −1.0000009E+01 | −2.1958390E−01 |
| A3 | 0.0000000E+00 | 0.0000000E+00 | 0.0000000E+00 | 0.0000000E+00 | 0.0000000E+00 |
| A4 | −3.1399427E−01 | −4.6783958E−01 | 4.9900207E−01 | −3.3232983E−01 | −7.4246524E−01 |
| A5 | −1.0269541E+00 | 5.6375814E+00 | −2.2740278E+00 | −3.4525503E−02 | 7.4621158E−01 |
| A6 | 1.3729474E+01 | −2.8555688E+01 | 8.4175631E+00 | 9.2344381E−01 | −1.3827024E−01 |
| A7 | −6.2689224E+01 | 7.3067225E+01 | −1.9105615E+01 | −1.4982607E+00 | −2.7858220E−01 |
| A8 | 1.5182087E+02 | −9.0165656E+01 | 1.9801117E+01 | 1.4170764E+00 | 3.2926001E−01 |
| A9 | −2.1075241E+02 | 1.9979957E+01 | 9.2359617E+00 | −8.8735307E−01 | −2.3887961E−01 |
| A10 | 1.6523644E+02 | 7.0370911E+01 | −4.9663530E+01 | 2.4300846E−01 | 8.7648537E−02 |
| A11 | −8.0221654E+01 | −5.1710353E+01 | 5.0453517E+01 | 8.6913191E−02 | 2.4214735E−02 |
| A12 | 8.0499321E+01 | −3.0022947E+01 | −7.2736994E+00 | −3.0395541E−02 | −3.0989347E−02 |
| A13 | −1.3912851E+02 | 3.7901820E+01 | −2.6617049E+01 | −6.9580734E−02 | 2.3239442E−03 |
| A14 | 1.3660798E+02 | 7.1610322E+00 | 2.4390795E+01 | 5.6307244E−02 | 5.7073335E−03 |
| A15 | −6.7738290E+01 | −1.8855243E+01 | −9.0516963E+00 | −1.6471476E−02 | −2.2219333E−03 |
| A16 | 1.3816105E+01 | 5.6323436E+00 | 1.2943877E+00 | 1.7538823E−03 | 2.5625161E−04 |

TABLE 17

Example 9
f = 3.653, Bf = 1.047, Fno. = 2.04, 2ω = 78.6

| Si | Ri | Di | Ndj | νdj |
|---|---|---|---|---|
| 1(St) | ∞ | −0.240 | | |
| *2 | 1.44000 | 0.591 | 1.54488 | 54.87 |
| *3 | 45.47208 | 0.112 | | |
| *4 | −3.45885 | 0.253 | 1.63350 | 23.62 |
| *5 | 45.44091 | 0.172 | | |
| *6 | 2.77771 | 0.261 | 1.63350 | 23.62 |
| *7 | 2.56410 | 0.475 | | |
| *8 | −3.98582 | 0.664 | 1.54488 | 54.87 |

TABLE 17-continued

Example 9
f = 3.653, Bf = 1.047, Fno. = 2.04, 2ω = 78.6

| Si | Ri | Di | Ndj | νdj |
|---|---|---|---|---|
| *9 | −1.10372 | 0.431 | | |
| *10 | 45.31286 | 0.291 | 1.54488 | 54.87 |
| *11 | 1.29221 | 0.408 | | |
| 12 | ∞ | 0.210 | 1.51633 | 64.14 |
| 13 | ∞ | 0.501 | | |
| 14(IMG) | ∞ | | | |

TABLE 18

Example 9

| Si | 2 | 3 | 4 | 5 | 6 |
|---|---|---|---|---|---|
| KA | −1.4251521E+00 | 9.9447036E+00 | −2.7472798E+01 | 4.6406486E+00 | −9.1517383E+00 |
| A3 | 0.0000000E+00 | 0.0000000E+00 | 0.0000000E+00 | 0.0000000E+00 | 0.0000000E+00 |
| A4 | −3.7353942E−01 | −2.3829652E−01 | 2.4736423E−01 | −1.1559494E−01 | −7.5027903E−02 |
| A5 | 3.6916963E+00 | 2.0975551E+00 | −1.4160125E−01 | 1.2504560E+00 | −1.1706467E−02 |
| A6 | −1.9815076E+01 | −1.0296516E+01 | −2.2396498E+00 | 1.4462824E+00 | −5.2883836E+00 |
| A7 | 8.4823768E+01 | 3.6560021E+01 | 9.8264275E+00 | −3.3646060E+01 | 1.8264647E+01 |
| A8 | −2.4730758E+02 | −9.0833148E+01 | −1.1166603E+01 | 1.3516190E+02 | −9.5942084E+00 |
| A9 | 4.1792656E+02 | 1.3811190E+02 | −1.6998121E+01 | −2.7774098E+02 | −6.5932990E+01 |
| A10 | −3.0049459E+02 | −9.5905589E+01 | 5.4818445E+01 | 3.6356941E+02 | 1.9518311E+02 |
| A11 | −1.2305813E+02 | −2.8921798E+01 | −4.6684820E+01 | −3.7359485E+02 | −3.1311553E+02 |
| A12 | 2.5747772E+02 | 9.0296829E+01 | 2.6356956E+01 | 2.4252694E+02 | 3.2553973E+02 |
| A13 | 1.7785995E+02 | −3.3871202E+01 | −7.2080768E+01 | 2.1321107E+02 | −1.3583746E+02 |
| A14 | −5.2862191E+02 | −2.5458278E+01 | 1.1618748E+02 | −6.8819491E+02 | −1.2143492E+02 |
| A15 | 3.6420956E+02 | 2.4332656E+01 | −7.4628524E+01 | 5.9655751E+02 | 1.6836726E+02 |
| A16 | −8.6305893E+01 | −5.9592346E+00 | 1.6629462E+01 | −1.8038870E+02 | −5.6342097E+01 |

| Si | 7 | 8 | 9 | 10 | 11 |
|---|---|---|---|---|---|
| KA | 2.5839657E+00 | −2.5911994E+00 | 3.2096844E−01 | 9.8809135E+00 | −2.1839738E−01 |
| A3 | 0.0000000E+00 | 0.0000000E+00 | 0.0000000E+00 | 0.0000000E+00 | 0.0000000E+00 |
| A4 | −1.6903730E−01 | −4.2489553E−01 | 2.3153602E−01 | −4.4904756E−01 | −7.8898392E−01 |
| A5 | −6.8452717E−01 | 5.2245281E+00 | 1.0233543E+00 | 2.7823540E−01 | 9.3234503E−01 |
| A6 | 5.1505326E+00 | −2.6929871E+01 | −9.3728056E+00 | −6.5885413E−02 | −7.2118333E−01 |
| A7 | −2.1044345E+01 | 6.7117100E+01 | 3.0619036E+01 | 7.5782446E−01 | 8.8235457E−01 |
| A8 | 4.9141843E+01 | −7.2064353E+01 | −5.6637712E+01 | −1.3996353E+00 | −1.0097126E+00 |
| A9 | −6.0318690E+01 | −1.8315527E+01 | 6.5450084E+01 | 9.2701512E−01 | 6.1146493E−01 |
| A10 | 2.2540741E+01 | 1.2405992E+02 | −4.7893820E+01 | −1.4265622E−01 | −1.0685921E−01 |
| A11 | 2.6010141E+01 | −1.0065325E+02 | 2.2199310E+01 | −1.0351622E−01 | −9.7154273E−02 |
| A12 | −8.0331498E+00 | −1.8760885E+00 | −8.5696914E+00 | 4.4189176E−02 | 9.0375649E−02 |
| A13 | −6.1597026E+01 | 2.7726270E+01 | 5.7312201E+00 | −5.5593721E−03 | −4.4808449E−02 |
| A14 | 8.8869138E+01 | 1.0229777E+01 | −3.9474929E+00 | 2.5357339E−03 | 1.5182084E−02 |
| A15 | −5.1653408E+01 | −2.0064075E+01 | 1.4625586E+00 | −1.2858828E−03 | −3.1019681E−03 |
| A16 | 1.1633631E+01 | 5.9302060E+00 | −2.1235946E−01 | 1.7921148E−04 | 2.7546445E−04 |

TABLE 19

Example 10
f = 3.708, Bf = 1.057, Fno. = 2.05, 2ω = 78.4

| Si | Ri | Di | Ndj | νdj |
|---|---|---|---|---|
| 1(St) | ∞ | −0.240 | | |
| *2 | 1.44421 | 0.586 | 1.54488 | 54.87 |
| *3 | 53.78641 | 0.101 | | |
| *4 | −2.72405 | 0.251 | 1.63350 | 23.62 |
| *5 | −10.09408 | 0.150 | | |
| *6 | 2.79322 | 0.262 | 1.63350 | 23.62 |
| *7 | 2.55108 | 0.487 | | |
| *8 | −3.50125 | 0.699 | 1.54488 | 54.87 |
| *9 | −1.08701 | 0.415 | | |
| *10 | −46.66913 | 0.280 | 1.54488 | 54.87 |
| *11 | 1.25150 | 0.408 | | |
| 12 | ∞ | 0.210 | 1.51633 | 64.14 |
| 13 | ∞ | 0.511 | | |
| 14(IMG) | ∞ | | | |

TABLE 20

Example 10

| Si | 2 | 3 | 4 | 5 | 6 |
|---|---|---|---|---|---|
| KA | −1.3845717E+00 | −8.3632835E+00 | −2.8494793E+01 | −1.0000025E+01 | −2.5764886E+00 |
| A3 | 0.0000000E+00 | 0.0000000E+00 | 0.0000000E+00 | 0.0000000E+00 | 0.0000000E+00 |
| A4 | −5.8211698E−02 | −3.3013149E−01 | 2.6720138E−01 | 9.6122580E−02 | −3.8586529E−01 |
| A5 | 6.7753784E−02 | 2.6883535E+00 | 2.0821910E−01 | 1.5473977E+00 | 1.6654225E+00 |
| A6 | 3.5506763E+00 | −1.1172661E+01 | −7.5873316E+00 | −5.4292358E+00 | −5.5187491E−01 |
| A7 | −1.3678647E+01 | 3.5016663E+01 | 3.4554337E+01 | 7.7512330E+00 | −2.1191997E+01 |
| A8 | 1.5089185E+01 | −9.1841692E+01 | −6.6131858E+01 | −2.3311309E+00 | 5.4049748E+01 |
| A9 | 1.1214986E+01 | 1.5868137E+02 | 3.5691849E+01 | 9.8867950E−01 | −1.0416081E+01 |
| A10 | −2.0391922E+01 | −1.1568424E+02 | 7.2693481E+01 | −2.7387046E+01 | −6.4979136E+01 |
| A11 | −4.7465185E+01 | −7.4287376E+01 | −1.4772049E+02 | 5.5039135E+01 | −1.4658191E+02 |
| A12 | 1.0202642E+02 | 1.5727724E+02 | 1.3739935E+02 | −1.8867447E+01 | 5.3053681E+02 |
| A13 | −2.4160517E+01 | 3.5977771E+01 | −1.3266555E+02 | −4.4577617E+01 | −3.2558494E+02 |
| A14 | −8.1035860E+01 | −2.2325034E+02 | 1.3855439E+02 | 3.6459936E+01 | −3.7458433E+02 |
| A15 | 7.4797825E+01 | 1.6886062E+02 | −8.6291476E+01 | 7.9164313E+00 | 5.5247028E+02 |
| A16 | −1.9975818E+01 | −4.2041289E+01 | 2.1169869E+01 | −1.1137585E+01 | −1.9499425E+02 |

| Si | 7 | 8 | 9 | 10 | 11 |
|---|---|---|---|---|---|
| KA | 2.2744410E+00 | −2.9114784E+00 | 3.0471200E−01 | 9.9170095E+00 | −2.1904997E−01 |
| A3 | 0.0000000E+00 | 0.0000000E+00 | 0.0000000E+00 | 0.0000000E+00 | 0.0000000E+00 |
| A4 | −4.9224041E−01 | −3.3450260E−01 | 4.0723579E−01 | −4.5668373E−01 | −8.4444010E−01 |
| A5 | 8.0450651E+00 | 5.0520770E+00 | −2.1418460E+00 | 4.9410790E−01 | 8.3874775E−01 |
| A6 | −6.4790394E+01 | −2.4407788E+01 | 9.7216288E+00 | −1.5637042E+00 | −1.4624103E−01 |
| A7 | 2.7539223E+02 | 4.1098453E+01 | −2.6847226E+01 | 6.1854756E+00 | −1.5695458E−01 |
| A8 | −6.8251471E+02 | 4.9406307E+01 | 4.2043159E+01 | −1.2467281E+01 | 9.9313878E−02 |
| A9 | 9.7874334E+02 | −3.2890621E+02 | −2.9070050E+01 | 1.4505197E+01 | −1.3656695E−01 |
| A10 | −6.9828683E+02 | 5.7698966E+02 | −1.2727688E+01 | −1.0046111E+01 | 1.3215346E−01 |
| A11 | 9.5817633E+01 | −4.2310724E+02 | 4.0774588E+01 | 3.3282864E+00 | −2.6240858E−02 |
| A12 | −6.6755498E+01 | −4.0522612E+01 | −2.8100181E+01 | 6.3855058E−01 | −2.0517831E−02 |
| A13 | 6.3485415E+02 | 3.1436822E+02 | 1.6581484E+00 | −1.2018916E+00 | 4.5039847E−03 |
| A14 | −8.4832653E+02 | −2.3758009E+02 | 7.7646166E+00 | 5.4623465E−01 | 5.0654286E−03 |
| A15 | 4.6391953E+02 | 7.7291249E+01 | −4.0293882E+00 | −1.1763710E−01 | −2.3824603E−03 |
| A16 | −9.5728775E+01 | −9.3710949E+00 | 6.5568673E−01 | 1.0234958E−02 | 2.9979663E−04 |

TABLE 21

Example 11
f = 3.678, Bf = 1.064, Fno. = 2.06, 2ω = 79.2

| Si | Ri | Di | Ndj | νdj |
|---|---|---|---|---|
| 1(St) | ∞ | −0.240 | | |
| *2 | 1.45333 | 0.580 | 1.54488 | 54.87 |
| *3 | 37.05043 | 0.115 | | |
| *4 | −2.75307 | 0.256 | 1.63350 | 23.62 |
| *5 | −9.29400 | 0.150 | | |
| *6 | 2.81696 | 0.271 | 1.63350 | 23.62 |
| *7 | 2.53164 | 0.486 | | |
| *8 | −3.28064 | 0.662 | 1.54488 | 54.87 |

TABLE 21-continued

Example 11
f = 3.678, Bf = 1.064, Fno. = 2.06, 2ω = 79.2

| Si | Ri | Di | Ndj | νdj |
|---|---|---|---|---|
| *9 | −1.09204 | 0.411 | | |
| *10 | 20.83069 | 0.290 | 1.54488 | 54.87 |
| *11 | 1.22541 | 0.408 | | |
| 12 | ∞ | 0.210 | 1.51633 | 64.14 |
| 13 | ∞ | 0.518 | | |
| 14(IMG) | ∞ | | | |

TABLE 22

Example 11

| Si | 2 | 3 | 4 | 5 | 6 |
|---|---|---|---|---|---|
| KA | −1.3236370E+00 | 1.0000009E+01 | −2.8976128E+01 | −9.0820219E+00 | −1.6760252E+00 |
| A3 | 0.0000000E+00 | 0.0000000E+00 | 0.0000000E+00 | 0.0000000E+00 | 0.0000000E+00 |
| A4 | 5.4722185E−02 | −4.6078973E−01 | 2.0703729E−01 | 2.8115042E−01 | −3.7079569E−01 |
| A5 | −6.8024343E−01 | 5.3585321E+00 | 5.2454329E−01 | 1.3267070E+00 | 1.0652229E+00 |
| A6 | 7.2528309E+00 | −3.1022178E+01 | −5.5497708E+00 | −8.7064891E+00 | 1.2615067E+00 |
| A7 | −2.9226335E+01 | 1.0400421E+02 | 2.2472309E+01 | 2.4381066E+01 | −2.0305351E+01 |
| A8 | 5.7462578E+01 | −1.7078985E+02 | −4.9321876E+01 | −4.4646120E+01 | 3.9098254E+01 |
| A9 | −4.8044827E+01 | −6.7821612E+01 | 6.0013445E+01 | 8.2976354E+01 | 4.2074380E+01 |
| A10 | −5.3164349E+00 | 9.0157486E+02 | −4.1763526E+01 | −1.5561894E+02 | −2.2137795E+02 |
| A11 | 1.1722989E+01 | −1.7452175E+03 | 2.5807345E+01 | 1.7943996E+02 | 1.7078668E+02 |
| A12 | 5.8248637E+01 | 1.3370954E+03 | −7.5555948E+00 | −6.0505575E+01 | 2.1088431E+02 |
| A13 | −7.7326394E+01 | 2.1900343E+02 | −5.4715052E+01 | −5.3258952E+01 | −3.0385289E+02 |
| A14 | 6.9414046E+00 | −1.1637581E+03 | 1.0547559E+02 | 2.5380848E+00 | −1.1520189E+02 |
| A15 | 3.2760609E+01 | 7.9975720E+02 | −7.3949492E+01 | 6.3541875E+01 | 3.3073934E+02 |
| A16 | −1.3873476E+01 | −1.8782466E+02 | 1.8526761E+01 | −3.1604271E+01 | −1.3539848E+02 |

| Si | 7 | 8 | 9 | 10 | 11 |
|---|---|---|---|---|---|
| KA | 2.7354863E+00 | −4.7156209E+00 | 3.3511779E−01 | 9.9965989E+00 | −2.4642878E−01 |
| A3 | 0.0000000E+00 | 0.0000000E+00 | 0.0000000E+00 | 0.0000000E+00 | 0.0000000E+00 |
| A4 | −1.2020443E−01 | −1.8807894E−01 | 2.4837318E−01 | −4.5057325E−01 | −8.0677770E−01 |
| A5 | −2.1407914E−01 | 3.1676856E+00 | 2.9264506E−01 | 1.1915806E−01 | 7.2229474E−01 |
| A6 | 1.2386329E+00 | −1.6025368E+01 | −3.1087997E+00 | 5.8979069E−01 | 1.2234304E−01 |
| A7 | −3.6151132E+00 | 3.2044843E+01 | 5.1166184E+00 | −5.4749620E−01 | −6.4398338E−01 |
| A8 | 1.6649009E+00 | −6.8417015E+00 | 6.7496213E+00 | 1.2612197E−01 | 6.4460228E−01 |
| A9 | 1.5306251E+01 | −7.4385954E+01 | −3.7229249E+01 | −1.0121910E−01 | −4.7469074E−01 |
| A10 | −2.8400211E+01 | 1.0521957E+02 | 5.9203523E+01 | 1.5503095E−01 | 2.3918694E−01 |
| A11 | −2.3074044E+01 | −9.6840804E+00 | −4.1844304E+01 | −4.9662597E−02 | −5.6078749E−02 |
| A12 | 1.4066778E+02 | −7.5780327E+01 | 7.4543893E−01 | 7.8319519E−03 | 1.1446156E−02 |
| A13 | −2.0894248E+02 | 2.9929066E+01 | 2.2280695E+01 | −3.2074252E−02 | −2.0374439E−02 |
| A14 | 1.5599279E+02 | 4.1916968E+01 | −1.7560871E+01 | 2.6665226E−02 | 1.4626911E−02 |
| A15 | −6.0314448E+01 | −3.8935699E+01 | 6.0285579E+00 | −8.0975650E−03 | −4.1983275E−03 |
| A16 | 9.6731979E+00 | 9.5350960E+00 | −8.1853922E−01 | 8.6517912E−04 | 4.3779987E−04 |

TABLE 23

| | Expression No. | | | | | |
|---|---|---|---|---|---|---|
| | (1) f/f1 | (2) f/f5 | (3) TTL/(f·tanω) | (4) L1f/φ | (5) f·tanω/L5r | φ |
| Example 1 | 1.56 | −1.29 | 1.46 | 0.76 | 2.30 | 1.866 |
| Example 2 | 1.59 | −1.32 | 1.48 | 0.74 | 2.27 | 1.914 |
| Example 3 | 1.66 | −1.43 | 1.40 | 0.85 | 2.64 | 1.811 |
| Example 4 | 1.41 | −1.25 | 1.46 | 0.90 | 2.48 | 1.736 |
| Example 5 | 1.48 | −1.60 | 1.41 | 0.82 | 2.34 | 1.786 |
| Example 6 | 1.55 | −1.39 | 1.40 | 0.78 | 2.46 | 1.858 |
| Example 7 | 1.44 | −1.69 | 1.39 | 0.81 | 2.44 | 1.804 |
| Example 8 | 1.33 | −1.60 | 1.43 | 0.81 | 2.30 | 1.786 |
| Example 9 | 1.34 | −1.49 | 1.44 | 0.80 | 2.31 | 1.791 |
| Example 10 | 1.37 | −1.66 | 1.42 | 0.80 | 2.42 | 1.809 |
| Example 11 | 1.33 | −1.53 | 1.41 | 0.81 | 2.48 | 1.785 |

The paraxial radius of curvature, surface distance, refractive index, and Abbe number described above were obtained by an optical measurement expert through measurements in the manners described below.

The paraxial radius of curvature was obtained in the following steps by measuring the lens using an ultra-accuracy 3-D profilometer, UA3P (product of Panasonic Factory Solutions Corporation). A paraxial radius of curvature $R_m$ (m is a natural number) and a conic constant $K_m$ are tentatively set and inputted to the UA3P and an $n^{th}$ order aspherical surface coefficient An of the aspherical surface shape formula is calculated from these and measurement data using an auxiliary fitting function of the UA3P. It is assumed, in the aspherical surface shape formula (A), that $C=1/R_m$ and $KA=K_m-1$. From $R_m$, $K_m$, An and the aspherical surface shape formula, a depth Z of the aspherical surface in an optical axis direction according to the height h from the optical axis is calculated. A difference between a calculated depth Z and a measured depth Z' is obtained at each height h from the optical axis, then a determination is made whether or not the difference is within a predetermined range, and if the difference is within the predetermined range, the set $R_m$ is taken as the paraxial radius of curvature. On the other hand, if the difference is outside of the predetermined range, at least one of the values of $R_m$ and $K_m$ used in the calculation of the difference is set to $R_{m+1}$ and $K_{m+1}$ and inputted to the UA3P, then processing identical to that described above is performed, and determination processing whether or not a difference between a calculated depth Z and a measured depth Z' at each height h from the optical axis is within the predetermined range is repeated until the difference between the calculated depth Z and the measured depth Z' at each height h from the optical axis falls within the predetermined range. The term, within a predetermined range, as used herein refers to within 200 nm. The range of h is a range corresponding to 0 to 1/3 of the maximum outer diameter.

The surface distance was obtained by performing measurement using a thickness and distance measuring device for coupling lenses, OptiSurf (product of Trioptics).

The refractive index was obtained by measuring a test object with the temperature of the test object being maintained at 25° C. using a precision refractometer, KPR-2000 (product of Shimadzu Corporation). The refractive index measured at the d-line (wavelength 587.6 nm) is taken as Nd. Likewise, the refractive indices measured at the e-line (wavelength 546.1 nm), the F-line (wavelength 486.1 nm), the C-line (wavelength 656.3 nm) and the g-line (wavelength 435.8 nm) are taken as Ne, NF, NC and Ng respectively. The Abbe number vd with respect to the d-line was obtained by substituting the Nd, NF and NC obtained by the aforementioned measurements in a formula, vd=(Nd−1)/(NF−NC).

What is claimed is:

1. An imaging lens, substantially consisting of five lenses, composed of:
    a first lens having a positive refractive power and a convex surface on the object side;
    a second lens having a negative refractive power and a concave surface on the object side;
    a third lens having a negative refractive power and a meniscus shape with a convex surface on the object side;
    a fourth lens having a positive refractive power and a meniscus shape with a concave surface on the object side; and
    a fifth lens having a negative refractive power and a concave surface on the image side, the image side surface having an aspherical shape with at least one inflection point located inward in a radial direction from the intersection between the image side surface and a principal ray of the maximum angle of view toward the optical axis, disposed in order from the object side,
    wherein the imaging lens satisfies conditional expressions given below:

$$0.91 < f/f1 < 2.47 \quad (1)$$

$$-2.13 < f/f5 < -1.03 \quad (2)$$

$$1.2 < TTL/(f \cdot \tan \omega) < 1.57 \quad (3)$$

where
    f: focal length of the entire system,
    f1: focal length of the first lens,
    f5: focal length of the fifth lens,
    TTL: distance on the optical axis from the object side surface of the first lens to the image plane when the back focus is expressed in air equivalent distance, and
    ω: maximum half angle of view when an object at infinity is in focus.

2. The imaging lens as claimed in claim 1, the imaging lens further satisfies a conditional expression given below:

$$0.5 < L1f/\phi < 0.97 \quad (4)$$

where
    L1f: paraxial radius of curvature of the object side surface of the first lens, and
    φ: entrance pupil diameter.

3. The imaging lens as claimed in claim 2, wherein the imaging lens further satisfies a conditional expression given below:

$$0.65 < L1f/\phi < 0.91 \quad (4\text{-}1).$$

4. The imaging lens as claimed in claim 2, wherein the imaging lens further satisfies a conditional expression given below:

$$0.75 < L1f/\phi < 0.87 \quad (4\text{-}2).$$

5. The imaging lens as claimed in claim 1, the imaging lens further satisfies a conditional expression given below:

$$1 < f \cdot \tan \omega / L5r < 3 \quad (5)$$

where
    L5r: paraxial radius of curvature of the image side surface of the fifth lens.

6. The imaging lens as claimed in claim 1, wherein the object side surface of the second lens has an aspherical shape having at least one inflection point located inward in a radial direction from the intersection between the object side surface and an axial marginal ray toward the optical axis.

7. The imaging lens as claimed in claim 1, wherein the object side surface of the third lens has an aspherical shape having at least one inflection point located inward in a radial direction from the intersection between the object side surface and an axial marginal ray toward the optical axis.

8. The imaging lens as claimed in claim 1, wherein the imaging lens further comprises an aperture stop disposed on the object side of the object side surface of the first lens.

9. The imaging lens as claimed in claim 1, wherein the imaging lens further satisfies a conditional expression given below:

$$1.1 < f/f1 < 2.05 \qquad (1\text{-}1).$$

10. The imaging lens as claimed in claim 1, wherein the imaging lens further satisfies a conditional expression given below:

$$-1.9 < f/f5 < -1.13 \qquad (2\text{-}1).$$

11. The imaging lens as claimed in claim 1, wherein the imaging lens further satisfies a conditional expression given below:

$$1.3 < TTL/(f \tan \omega) < 1.51 \qquad (3\text{-}1).$$

12. The imaging lens as claimed in claim 1, wherein the imaging lens further satisfies a conditional expression given below:

$$1.22 < f/f1 < 2.05 \qquad (1\text{-}2).$$

13. The imaging lens as claimed in claim 1, wherein the imaging lens further satisfies a conditional expression given below:

$$-1.9 < f/f5 < -1.2 \qquad (2\text{-}2).$$

14. The imaging lens as claimed in claim 1, wherein the imaging lens further satisfies a conditional expression given below:

$$1.34 < TTL/(f \tan \omega) < 1.51 \qquad (3\text{-}2).$$

15. The imaging lens as claimed in claim 1, wherein the imaging lens further satisfies a conditional expression given below:

$$1.22 < f/f1 < 1.86 \qquad (1\text{-}3).$$

16. The imaging lens as claimed in claim 1, wherein the imaging lens further satisfies a conditional expression given below:

$$-1.81 < f/f5 < -1.2 \qquad (2\text{-}3).$$

17. The imaging lens as claimed in claim 1, wherein the imaging lens further satisfies a conditional expression given below:

$$1.34 < TTL/(f \tan \omega) < 1.49 \qquad (3\text{-}3).$$

18. An imaging apparatus equipped with the imaging lens as claimed in claim 1.

* * * * *